US011938075B1

(12) United States Patent
Denio et al.

(10) Patent No.: US 11,938,075 B1
(45) Date of Patent: Mar. 26, 2024

(54) CORNER MOUNTED MASSAGE ROLLER ASSEMBLY

(71) Applicants: Dale William Denio, Reno, NV (US); Deborah A. Denio, Bakersfield, CA (US)

(72) Inventors: Dale William Denio, Reno, NV (US); Deborah A. Denio, Bakersfield, CA (US)

( * ) Notice: Subject to any disclaimer, the term of this patent is extended or adjusted under 35 U.S.C. 154(b) by 0 days.

(21) Appl. No.: 18/221,351

(22) Filed: Jul. 12, 2023

(51) Int. Cl.
*A61H 15/00* (2006.01)

(52) U.S. Cl.
CPC ....... *A61H 15/00* (2013.01); *A61H 2015/005* (2013.01); *A61H 2201/0107* (2013.01); *A61H 2201/0126* (2013.01); *A61H 2201/1253* (2013.01)

(58) Field of Classification Search
CPC .............. A61H 15/00; A61H 2015/005; A61H 2015/007; A61H 2015/0042; A61H 2201/0119; A61H 2201/0123; A61H 2201/0126; A61H 2201/1253; A47G 1/1653; F16M 13/025
USPC ........................................................ 248/220.1
See application file for complete search history.

(56) References Cited

U.S. PATENT DOCUMENTS

| | | | | |
|---|---|---|---|---|
| 6,015,123 | A * | 1/2000 | Perez | F16M 13/025 248/220.21 |
| 6,110,132 | A * | 8/2000 | Kurpieski | A46B 9/02 4/606 |
| 9,306,604 | B2 * | 4/2016 | Jurawan | H04B 1/03 |
| 9,849,065 | B1 * | 12/2017 | Kozlevcar | A61H 39/04 |
| 2011/0166481 | A1 * | 7/2011 | Rhoad | A61H 7/002 248/231.51 |
| 2013/0165827 | A1 * | 6/2013 | Liu | A63B 23/1209 601/137 |
| 2015/0240991 | A1 * | 8/2015 | Gallo | A47G 1/1653 248/304 |
| 2016/0324717 | A1 * | 11/2016 | Burton | A61H 7/001 |
| 2018/0135799 | A1 * | 5/2018 | Dang | F16M 13/025 |
| 2018/0296430 | A1 * | 10/2018 | Bouch | A61H 15/00 |
| 2019/0203880 | A1 * | 7/2019 | Bailey | F16B 15/0046 |

* cited by examiner

*Primary Examiner* — Colin W Stuart
*Assistant Examiner* — Douglas Y Sul

(57) ABSTRACT

The present disclosure relates to a corner mounted massage roller assembly that is structured to fit against and detachably mount to the outside corner or a flat surface of the structure via one or more fastening components. Particularly, the corner mounted massage roller assembly may include a fastening component having one or more fastening plate members for mounting to an outside corner of a structure and a detachable roller assembly component having a corner-mount adapter member that may be detachably coupled to a massage head component by an axel base.

19 Claims, 20 Drawing Sheets

CORNER MOUNTED MASSAGE ROLLER ASSEMBLY

FIELD OF THE DISCLOSURE

The present disclosure relates to a novel massage roller assembly. In particular, the massage roller assembly includes at least one massage roller coupled to a corner mount assembly which is configured to mount to any outside corner of a structure.

BACKGROUND

Conventional massage rollers include foam rollers, massage sticks, massage guns, and other similar handheld massage devices, providing self-therapeutic applications to quickly relieve muscle discomfort, stiffness, and inflammation after exercise. A foam roller is a thin, cylinder-shaped, compressed foam tube, that is commonly applied on a planar surface, by which a user may roll a portion of their back, leg, or torso against the foam tube in a back-and-forth rolling-action movement, using their own body weight to apply an even pressure against the foam tube along targeted muscle groups (e.g., quads, calves, abdominal areas, and so on). Like foam rollers, massage sticks generally have a cylindrical shape covered by a foam tube. However, massage sticks have a narrow radius in comparison to foam rollers and are intended to be gripped and held by one or both hands of the user. The use of massage sticks, sometimes referred to as recovery sticks or muscle roller sticks, may offer significant relief for pre- and post-workouts through deep tissue self-massage techniques. Massage sticks have a sturdy and non-flexible shaft covered with a foam sleeve, making them beneficial for applying even pressure along the limb areas. In addition, massage sticks are thin, portable, and lightweight, allowing them to easily store in a luggage or an equipment bag. Other massage devices include massage guns which are handheld devices and equipped with a motor and rechargeable battery which vibrate at low-to-high intensity settings and pulsating modes. Massage guns resembles a handheld power drill in appearance and occasionally in sound, having interchangeable attachments heads designed for specific body parts and muscle groups. In practice, massage guns provide self-vibration therapy, performing deep tissue massage therapy on oneself in order to relax and loosen tense muscles.

These personal massage rollers described hereinabove serve as self-therapeutic tools that can offer many health advantages after pre- or post-workouts, including alleviating muscle soreness, reducing inflammation, muscle stimulation for repair and recovery, remedying tension and tightness, improving blood flow and elasticity of muscle tissue, joints, and fascia. Although these personal massage rollers provide users many health advantages, the user is required to either apply pressure of their body or limbs against the massage rollers while holding or freely handling the rollers on a flat surface. These massage devices are not stationary, non-fixed devices and therefore can be lost when not in use.

Therefore, it would be highly desirable to have a personal massage roller that is portable, compact, and easy to use, yet capable of being quickly applied and secured to a fixed surface, providing the user a convenient and stationary location for self-massage therapy.

SUMMARY

It is an advantage of the present disclosure to provide a corner mounted massage roller assembly, including a fastening component with one or more fastening plate members for mounting to an outside corner of a structure, and a detachable roller assembly component having a corner-mount adapter member detachably coupled to a massage head component by an axel base, where the corner-mount adapter member is structured to fit against and detachably mount to the outside corner of the structure via the fastening component.

In one aspect, the axel base may include a stem connecting member by which the corner-mount adapter member is detachably coupled to a massage head component, and each fastening plate member may have a thin rectangular body with keyhole slots disposed along a center and lengthwise portion of the fastening plate member. In another aspect, the corner-mount adapter member may include a base member having a receiving coupler disposed at a first end of the base member and a Y-bracket member disposed and attached to a second opposing end of the base member. In yet another aspect, the Y-bracket member may include two support arm members having an angular separation of approximately 90 degrees.

In another implementation, each support arm member may include keyed members which are disposed at distal ends of each support arm member. The keyed members of each support arm member may be detachably coupled to the keyhole slots of the fastening plate members. The receiving coupler of the corner-mount adapter member may include interlocking rails disposed and evenly spaced along an interior portion of the receiving coupler. The stem connecting member of the detachable roller assembly component may be detachably coupled to the receiving coupler of the corner-mount adapter member. The stem connecting member may include interlocking grooves disposed and evenly spaced along an outer portion of the stem connecting member, matching the spacing of the interlocking rails of the receiving coupler, and allowing the axel base to incrementally rotate at a fixed number of positions when inserted and attached to the receiving coupler of the corner-mount adapter member.

In another implementation, the massage head component may include a two-roller assembly or a single massage head attachment. A foam cover may be applied on the two-roller assembly or the single massage head attachment. The two-roller assembly may include spherically shaped heads, protruding shaped heads, tapered capsule shaped heads, bell-shaped heads, or double spheroidal heads.

In yet another implementation, at least two fastening plate members are mounted adjacent to the outside corner of the structure by hook-and-loop fasteners, drywall screws, wood screw, c-screws, l-screws, or double-side adhesive tape.

In still yet another implementation, the massage roller assembly may be mounted to the outside corner of the structure at a height that is between a head portion and a foot portion of a user.

In yet another implementation, a triangle block fixture may be coupled to the detachable roller assembly component for adapting the corner mounted massage roller assembly to a flat surface. In addition, the triangle block fixture may be in a shape of an equilateral triangular prism.

These and other objects, features and advantages of the present disclosure will become more apparent in light of the following detailed description of preferred embodiments thereof, as illustrated in the accompanying drawings.

BRIEF DESCRIPTION OF THE DRAWINGS

The present disclosure will be more clearly understood from the following detailed description of some embodiments of the disclosure and from the attached drawings, in which.

In the appended figures, one or more elements may have the same reference numeral in different figures indicating previously described.

DETAILED DESCRIPTION

Figure 1:
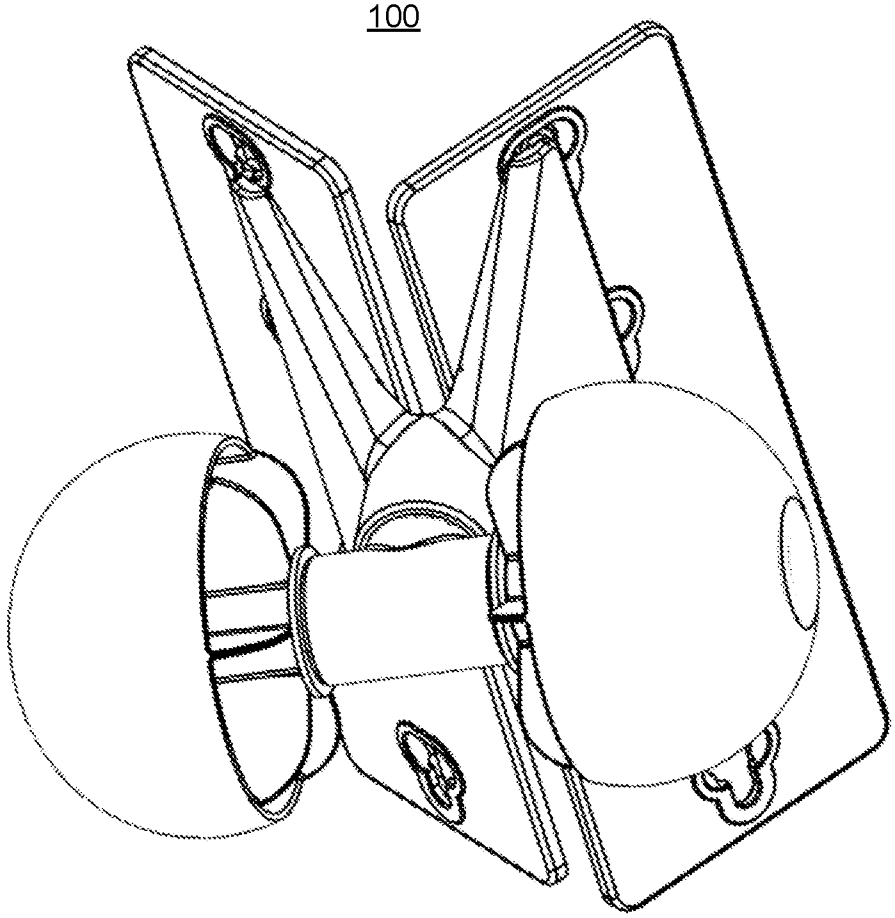
FIG. 1 illustrates a perspective view of a novel massage roller assembly, in accordance to an embodiment.
Figure 2A:
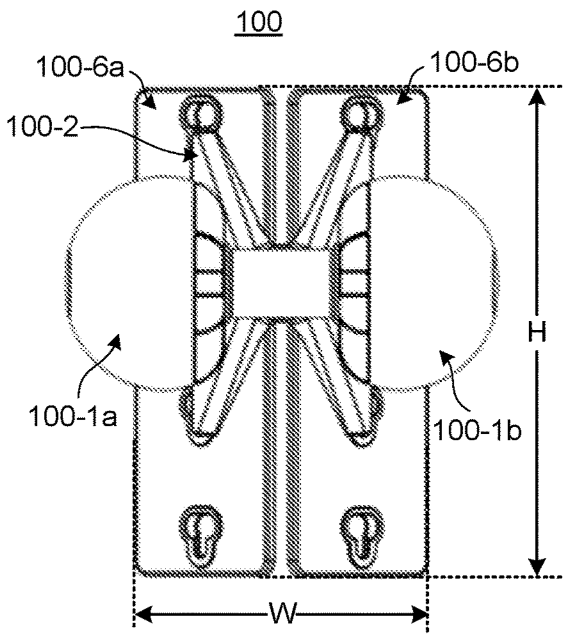
FIG. 2A—FIG. 2D illustrate a front view, a top view, a side view, and perspective view, respectively, of the massage roller assembly, in accordance to an embodiment.
Figure 2B:
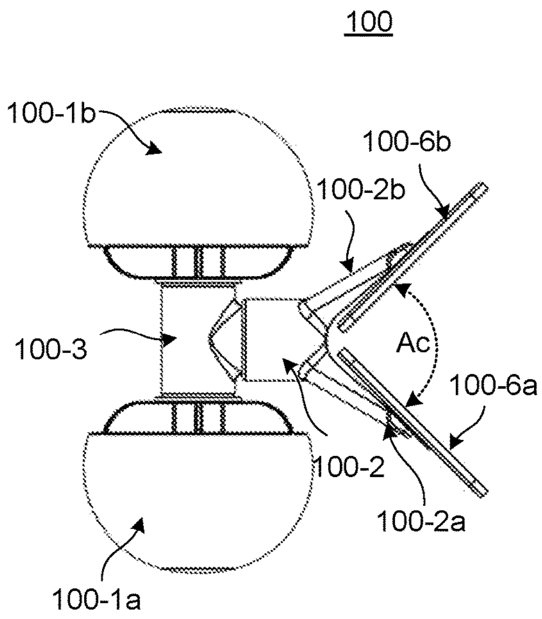
Figure 2C:
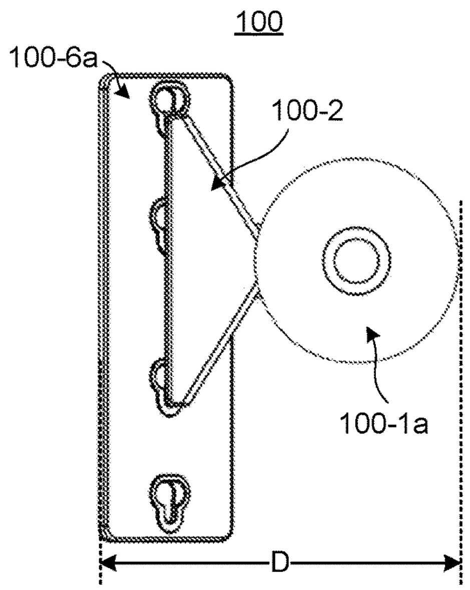
Figure 2D:
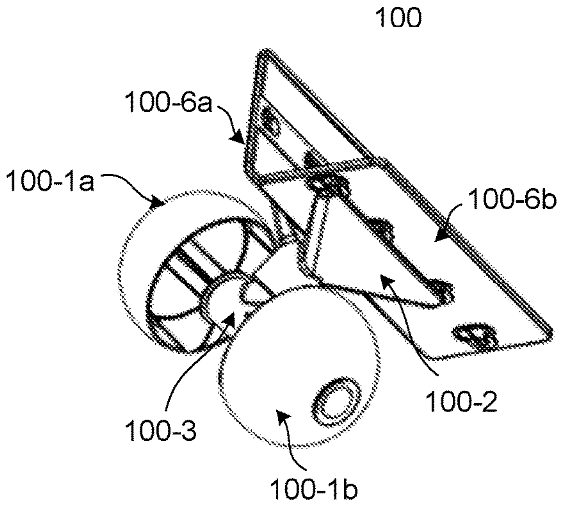

FIG. 1 illustrates a perspective view of a novel massage roller assembly 100, in accordance to an embodiment. In one aspect, the massage roller assembly 100 has a compact design with minimal moving parts, having one or more fastening components by which the assembly 100 is affixed along a single outside corner portion of a structure, including but not limited to a door corner, a wall corner, a desk corner, a cabinet corner, a corner of a rectangular post, or any other type of free standing furniture having an outside corner. In particular, the assembly 100 may include attachment members and features, allowing it to quickly and conveniently mount to or dismount from an outside corner of the structure. In addition, the assembly 100 may include detachable, rotatable, and expandable components allowing a user to swap out the type of rollers, set various height placements of the assembly, and adjust the angle of rollers which can be customized to suit the therapeutic needs of the user.

FIG. 2A—FIG. 2D illustrate a front view, a top view, a side view, and perspective view, respectively, of the massage roller assembly 100, in accordance to an embodiment. In one implementation, the massage roller assembly 100 may include two roller heads (100-1*a*, 100-1*b*) coupled to a corner-mount adapter member 100-2 via an axel base 100-3 and axel member (not shown) disposed therein. The massage roller assembly 100 may also include a fastening component having two mounting plates (100-6*a*, 100-6*b*) where each mounting plate is detachably coupled to the corner-mount adapter member 100-2 via support arm members (100-2*a*, 100-2*b*), respectively. In addition, the two mounting plates (100-6*a*, 100-6*b*) are angularly separated by a corner angle Ac, when attached to the corner-mount adapter member 100-2. In practice, the corner angle Ac measures approximately 90 degrees or equivalent to a right angle. By way of a non-limiting example, working dimensions of the massage roller assembly 100 may be, but is not limited to, 8-10 inches in length (H), 3-5" in width (W), and 4-6" inches in depth (D).

Figure 3:
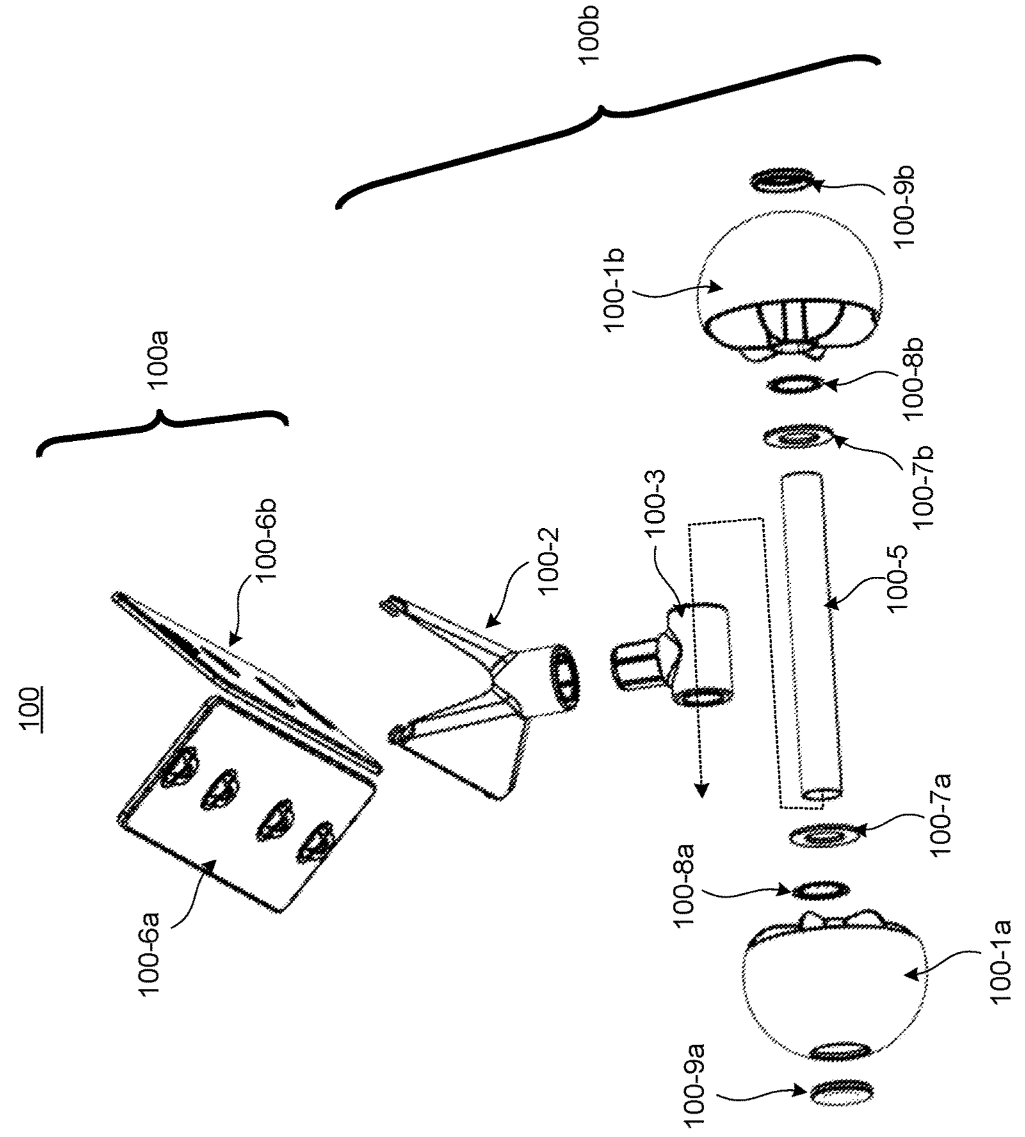
FIG. 3 illustrates an exploded view of the massage roller assembly, in accordance to an embodiment.
Figure 4C:
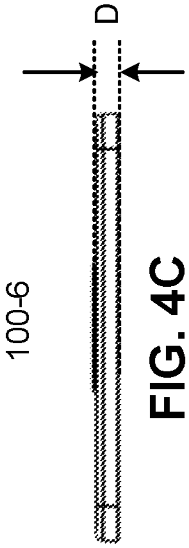
FIG. 4A—FIG. 4E illustrate a front view, a back view, a top view, a side view, and perspective view of the fastening plate members, in accordance to an embodiment.
Figure 4E:
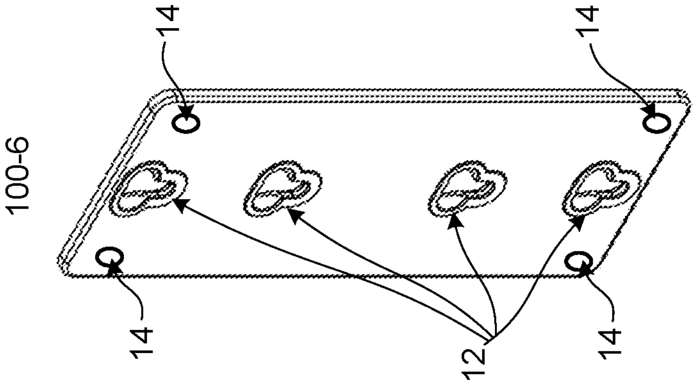
Figure 4B:
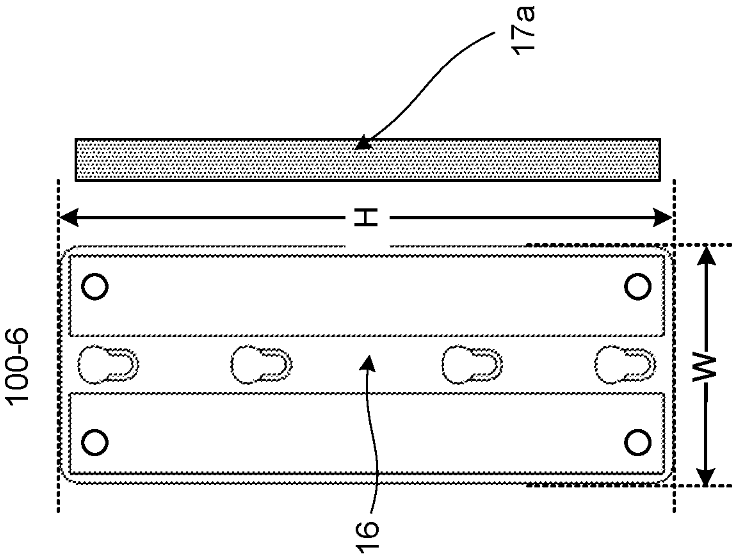
Figure 4A:
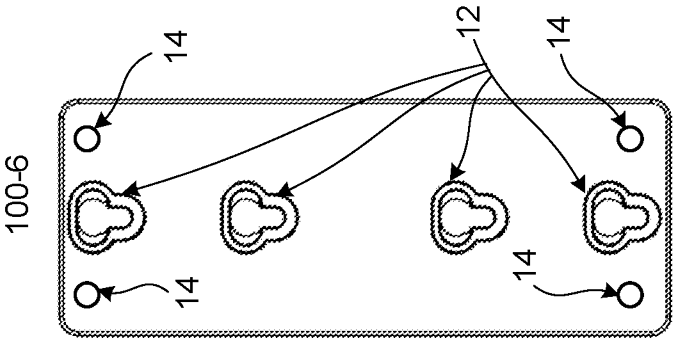
Figure 4D:
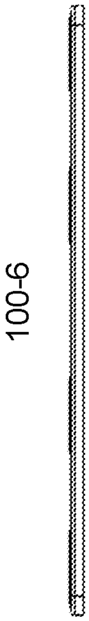

FIG. 3 illustrates an exploded view of the massage roller assembly 100, in accordance to an embodiment. The massage roller assembly 100 is generally arranged in two distinct groups (fastening component 100*a* and detachable roller assembly component 100*b*), where the fastening component 100*a* includes the fastening plate members (100-6*a*, 100-6*b*), while the detachable roller assembly component 100*b* includes the corner-mount adapter member 100-2 and the two roller heads (100-1*a*, 100-1*b*), axel base 100-3, and axel member 100-5. In addition, each roller (100-1*a*, 100-1*b*) is attached to each end of the axel member 100-roller head and held in place by washers (100-7*a*, 100-7*b*) and self-locking retaining rings (100-8*a*, 100-8*b*) or other fasteners (e.g., bolts, nuts, threaded axel with washers and self-locking nuts). Suitable materials for washers (100-7*a*, 100-7*b*) may include, but is not limited to, engineered plastics, metals (aluminum, brass, stainless steel), or low friction, high stiffness materials having excellent dimensional stability. Moreover, each roller head (100-1*a*, 100-1*b*) may also include end caps (100-9*a*, 100-9*b*) for covering the exposed ends of the each roller after insertion and installation onto the axel member 100-5.

FIG. 4A—FIG. 4E illustrate a front view, a back view, a top view, a side view, and perspective view of a single fastening plate member 100-6 which are applicable to both fastening plate members (100-6*a*, 100-6*b*) described hereinabove, in accordance to an embodiment. In one aspect, the fastening plate member 100-6 generally has a thin rectangular body with multiple slots formed therein. These slots may include adapter keyholes 12 disposed along a center and lengthwise portion of the fastening plate member 100-6 and plate mounting slots 14 disposed near each corner of fastening plate member. Each keyhole 12 includes a round hole at the bottom and a slot that extends upward through the plate member. In practice, the keyhole 12 generally has a round hole at the bottom and a slot that extends upward, resembling an upside-down keyhole and configured to receive a peg having matching keyed head which is inserted and secured to the keyhole 12.

The fastening plate member 100-6 may also include a recessed area disposed on the back side of the plate for receiving hook-and-loop fasteners 17*a* which is applied to back of plate via an adhesive strip or glue. By way of another non-limiting example, working dimensions of the fastening plate member 100-6 may be, but is not limited to, 8-10 inches in length (H), 1-3" in width (W), and 0.125-0.500" inches in depth (D).

Figure 5A:
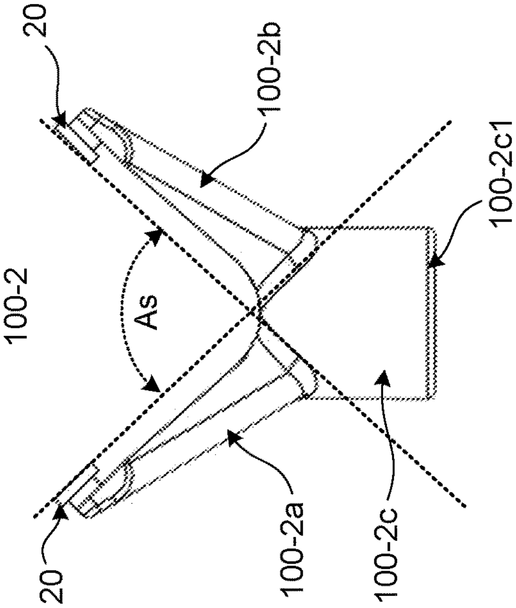
FIG. 5A—FIG. 5D illustrate a front view, a top view, a side view, and perspective view, respectively, of the corner-mount adapter member, in accordance to an embodiment.
Figure 5B:
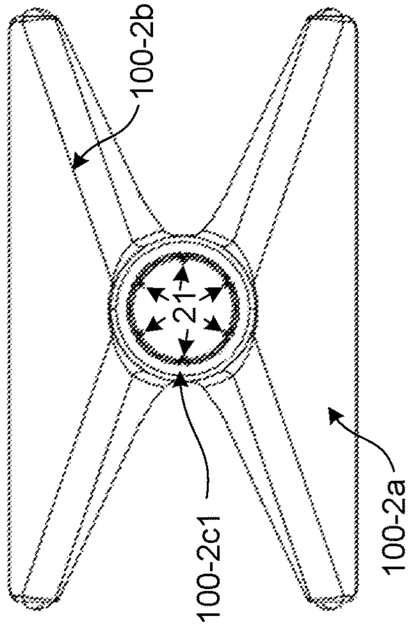
Figure 5C:
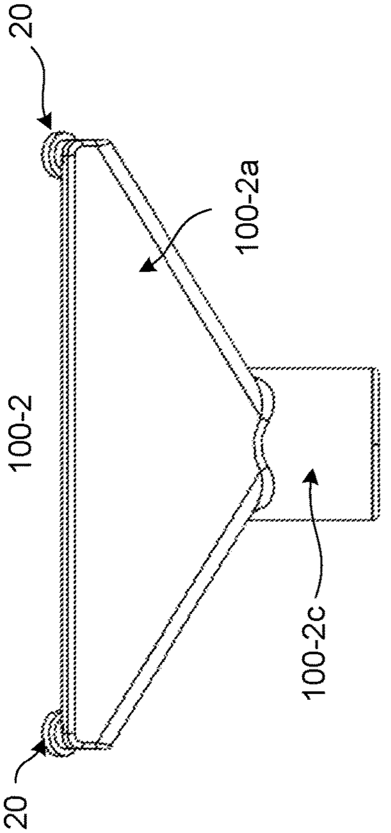
Figure 5D:
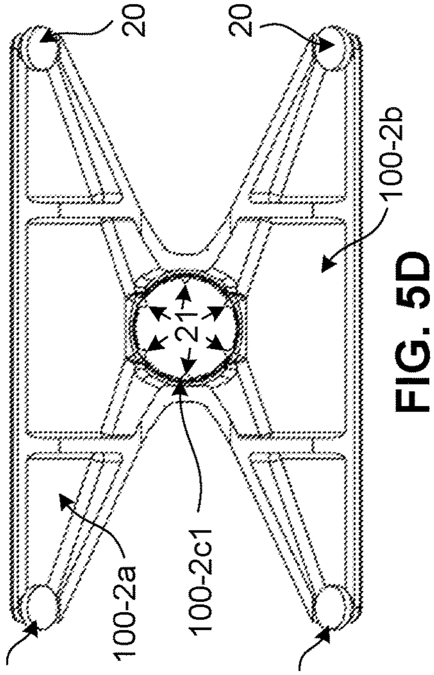
Figure 6B:
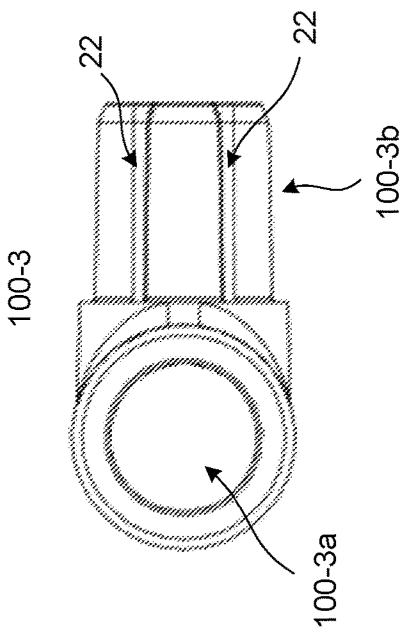
FIG. 6A—FIG. 6D illustrate a front view, a top view, a side view, and perspective view, respectively, of the axel base, in accordance to an embodiment.
Figure 6D:
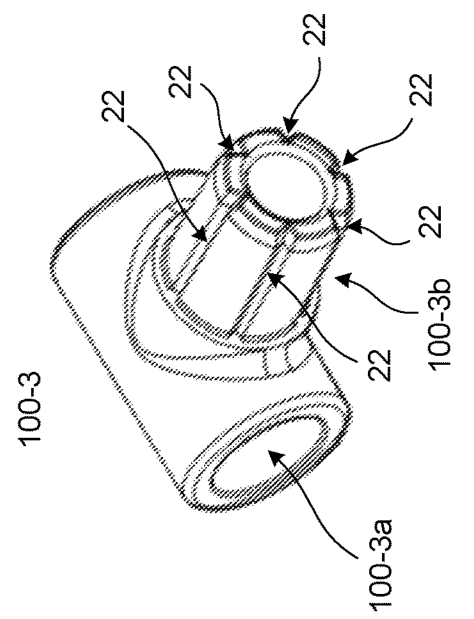
Figure 6A:
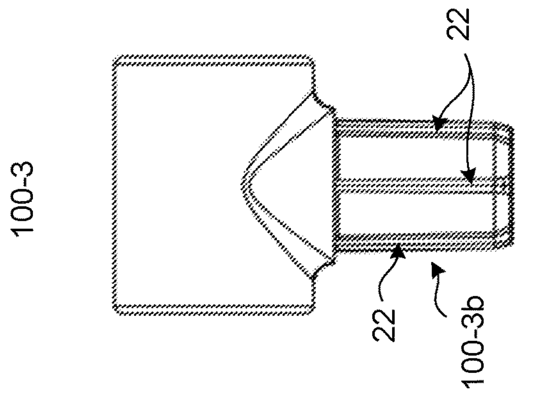
Figure 6C:
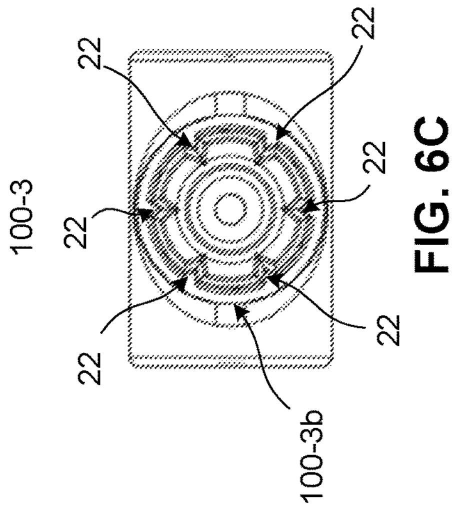
Figure 7A:
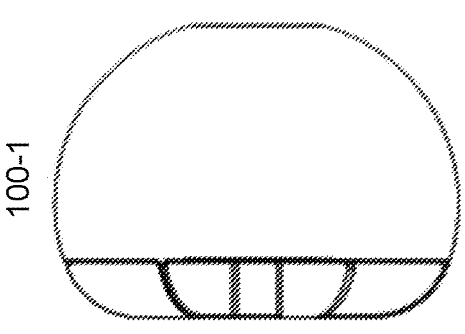
FIG. 7A—FIG. 7D illustrate a front view, a top view, a side view, and perspective view, respectively, of a single roller head, in accordance to an embodiment.
Figure 7B:
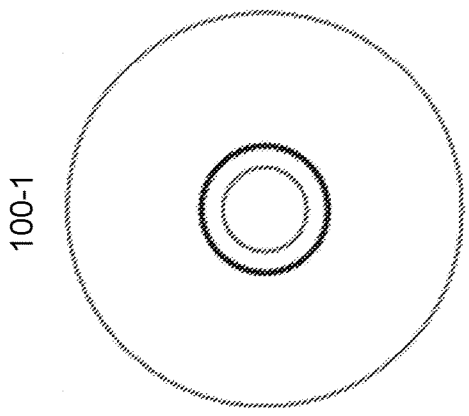
Figure 7C:
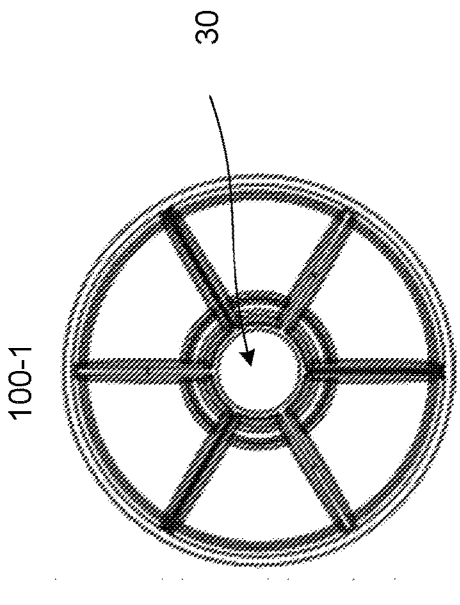
Figure 7D:
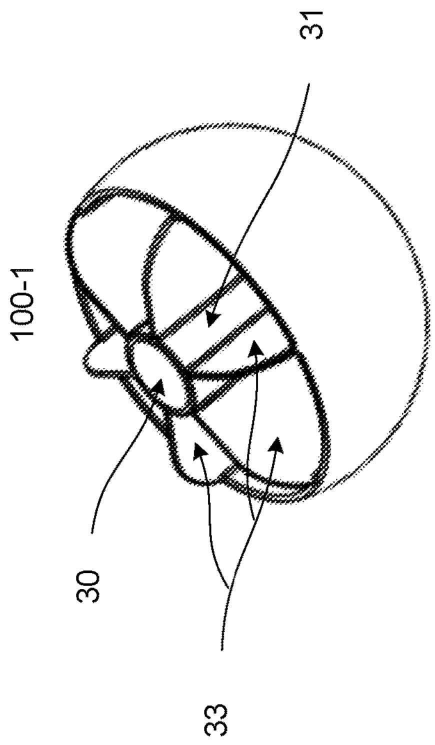

FIG. 5A—FIG. 5D illustrate a front view, a top view, a side view, and perspective view, respectively, of the corner-mount adapter member 100-2, in accordance to an embodiment. In one aspect, the corner-mount adapter member 100-2 includes a base member 100-2*c* having a receiving coupler 100-2*c*1 disposed at a first end of the base member and a Y-bracket member disposed and attached to a second opposing end thereof, where the Y-bracket member includes the two support arm members (100-2*a*, 100-2*b*) having an angular separation As of approximately 90 degrees as shown in FIG. 5A. In addition, each support arm members (100-2*a*, 100-2*b*) may have keyed members 20 which are disposed at distal ends of the arm members. In another aspect, each keyed member 20 may have a cylindrical peg, resembling a round flat head screw, which can be inserted and secured to keyholes 12, thereby providing a flushed mounting system by which the corner-mount adapter member 100-2 is fastened to plate members (100-6*a*, 100-6*b*). In yet another aspect, the receiving coupler 100-2*c*1 of the base member 100-2*c* has an opening or hole through which a portion of the axel base 100-3 may be inserted when the massage roller assembly 100 is fully assembled. In addition, the receiving coupler 100-2*c*1 may include interlocking rails 21 disposed and evenly spaced along an interior portion of the receiving coupler 100-2*c*1, allowing the axel base 100-3 to incrementally rotate at a fixed number of positions when attached thereon. A further description and application of this rotating feature are provided in later in this document.

FIG. 6A—FIG. 6D illustrate a front view, a top view, a side view, and perspective view, respectively, of the axel base 100-3, in accordance to an embodiment. In one aspect, the shape of the axel base 100-3 resembles a t-connector having an axel opening 100-3*a* through which the axel member 100-5 is inserted and a stem connecting member 100-3*b* which is inserted into and detachably coupled to the receiving coupler 100-2*c*1 of the corner-mount adapter member 100-2 when fully assembled. In another aspect, the stem connecting member 100-3*b* may include interlocking grooves 22 disposed and evenly spaced along an outer portion of the stem connecting member 100-3*b*, matching the spacing of the interlocking rails 21 of the receiving coupler 100-2*c*1, and thereby allowing the axel base 100-3 to incrementally rotate at a fixed number of positions when inserted and attached to the receiving coupler 100-2*c*1. In application, the receiving coupler 100-2*c*1 and the stem connecting member 100-3*b* are made to be press fitted or interference fitted where the fastening of these two components is achieved by normal force or friction. This is generally accomplished by making the stem connecting member 100-3*b* inserted tightly into a slightly smaller hole of the receiving coupler 100-2*c*1, with the tight fitting holding both components in place.

FIG. 7A—FIG. 7D illustrate a front view, a top view, a side view, and perspective view, respectively, of a single roller head 100-1 which is applicable to both roller heads (100-1*a* or 100-1*b*), in accordance to an embodiment. In an implementation, the roller head 100-1 generally has a hemispherical shaped structure (e.g., a half-ball) having an axel slot 30 disposed therein. An end portion of the axel member 100-5 is inserted to the axel slot 30 for one roller (100-1*a*) while another end portion of the axel member 100-5 is inserted to the axel slot 30 for the other roller (100-1*b*) when the massage roller assembly 100 is fully assembled. In one instance, the roller head may include a shell of a half-ball structure having an axel tube 31 disposed along a center portion of the roller head with equally distributed reinforcement walls 33 encompassing the axel tube 31, thereby providing structural integrity of the shell structure while minimizing total weight, materials, and cost of the roller head as compared to one having a solid inner structure.

Figure 8A:
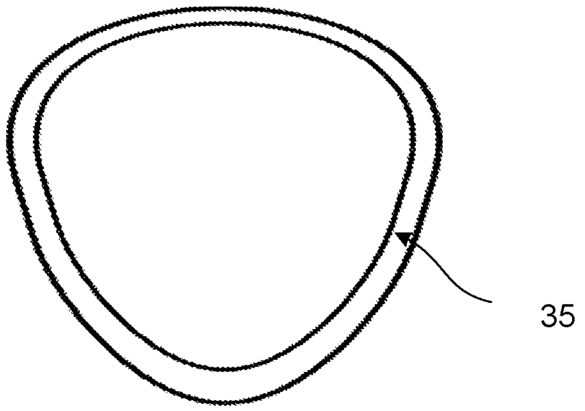
FIG. 8A—FIG. 8D illustrate various types of the roller heads for targeting different muscle groups or body parts, in accordance to an embodiment.
Figure 8B:
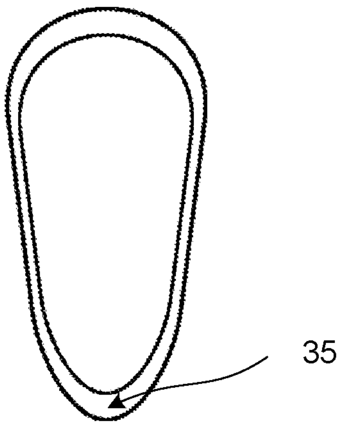
Figure 8C:
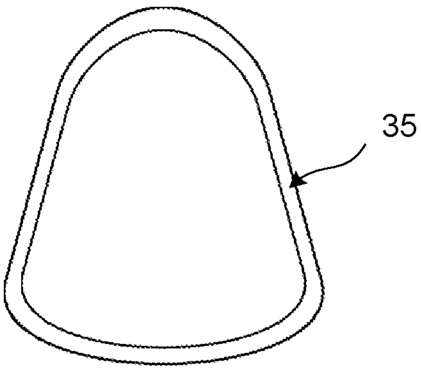
Figure 8D:
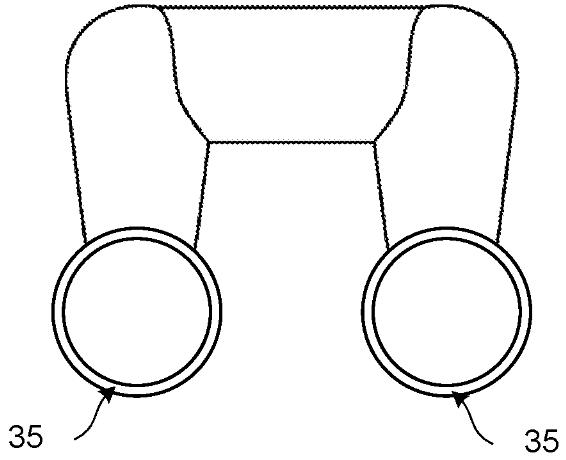

FIG. 8A—FIG. 8D illustrate other types of the roller heads 100-1 which may be applied to the massage roller assembly 100 for targeting different muscle groups or body parts, in accordance to an embodiment. In general, the type of roller head can be of any shape, size, hardness, and texture. In one example, the roller head has a spherical body (as shown in FIGS. 7A-7D), having a round and rolling smooth edge for relieving tension and soreness along muscle groups of the user's body. In another example, the roller head is generally spheroidal in shape having a protruding end portion as shown in FIG. 8A. Like the previous roller head, the protruding spheroid may have a smooth edge but be narrower at an end of its body, resulting in a rounded cone portion at its narrow end. In another example, the roller head may have a tapered capsule shaped structure as shown in FIG. 8B having a smaller massage surface area which may be ideal for treating muscle knots which are sensitive areas of the body appearing as hardened spot in muscle fibers, causing muscle tightness, aches, or myofascial pain. In another example, the roller head may include a solid bell-like structure as shown in FIG. 8C, having a wide massage surface area targeted for targeting larger muscle areas of the body. In another example, the roller head may include a double spheroidal head as shown in FIG. 8D whereby different points of muscle groups are simultaneously targeted by two smaller massage surface area of the double spheroidal head. In an implementation, the massage roller assembly 100 may have one type of roller head 100-1*a* which is paired with a different type roller head on the other roller head 100-1*b* by applying the various roller head types presented hereinabove, allowing expanded functional capabilities for different muscle groups. Furthermore, the roller heads presented hereinabove are only mere examples and do not limit the many other structural shapes and configurations which can be applied to the roller heads.

In yet another implementation, the massage roller assembly 100 may also include a foam cover 35 applied to outer shell of the roller head, having the same shape as the roller head and fully encapsulating it. The foam cover 35 may include soft, medium, or firm materials to support the user's desired therapeutic needs. For example, materials of the foam cover 35 may include, but is not limited to, hard and soft materials composed of PE (polyethylene), EVA polyurethane or other shock-absorbing elastomer materials.

Figure 9A:
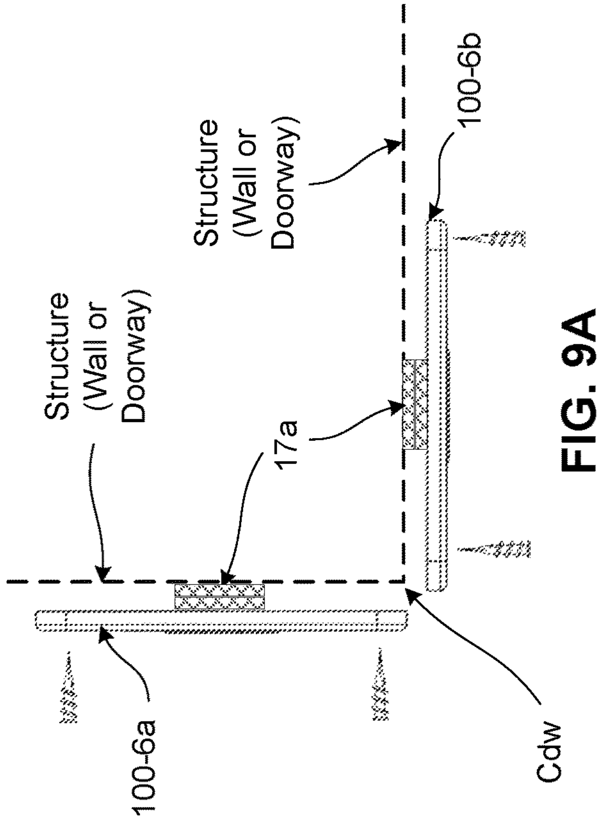
FIG. 9A—FIG. 9C illustrate attachment members for mounting the fastening plate members to an outside corner of a structure, in accordance to an embodiment.
Figure 9B:
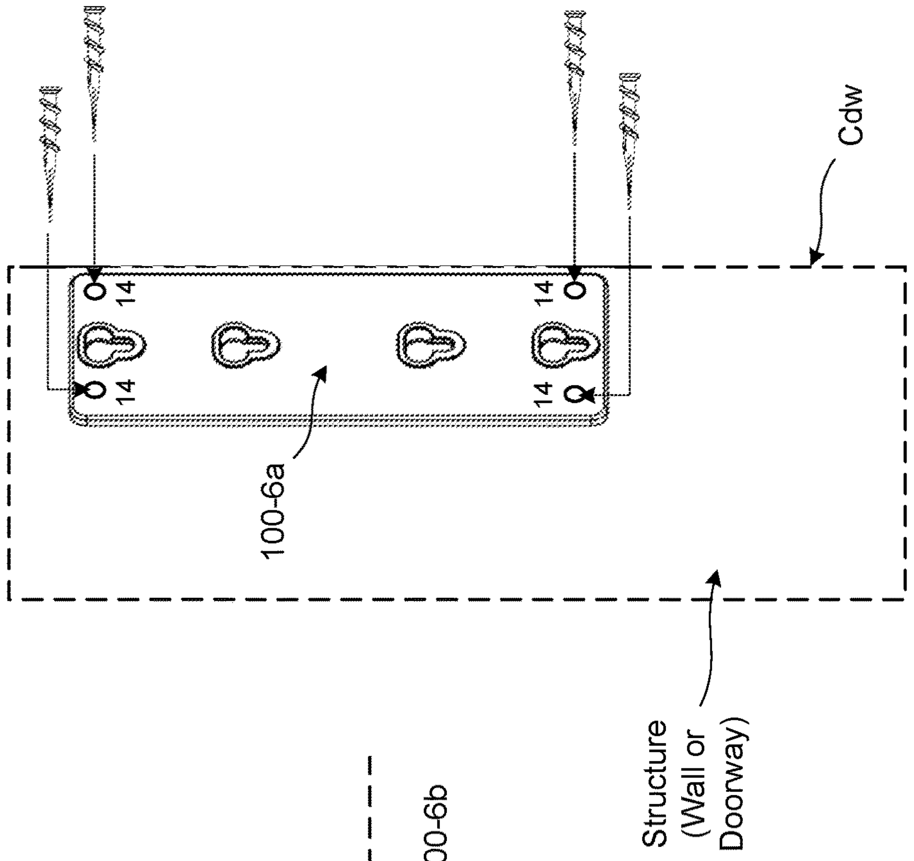
Figure 9C:
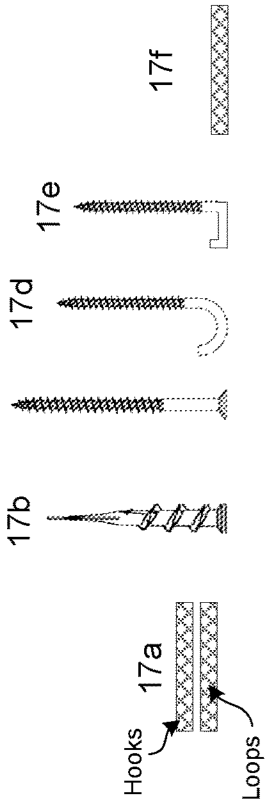

FIG. 9A—FIG. 9C illustrate attachment members for mounting the fastening plate members (100-6*a*, 100-6*b*) to a single outside corner Cdw of a structure, in accordance to an embodiment. These attachment members may include, for example, hook-and-loop fasteners 17*a*, drywall screws 17*b*, wood screw 17*c, c*-screws 17*d*, 1-screws 17*e*, double-side adhesive tape 17*f*, and glue (not shown) as shown in FIG. 9C. For the hook-and-loop fasteners 17*a*, the back side of each fastening plate member may have a recessed area therein for receiving a portion of the hook-and-loop fasteners 17*a* which is applied directly to back side of fastening plate member via an adhesive strip or glue, while the other portion of the hook-and-loop fasteners 17*a* may be applied to a portion of the structure, near the outside corner, via the adhesive strip or glue. For the screw type fasteners (17*b*, 17*c*, 17*d*, and 17*e*), four plate mounting slots 14 of each fastening plate member provide an opening through which the screw type fasteners are inserted and then mechanically fastened into to the structure, thereby mounting the fastening plate member to the structure as shown in FIG. 9A and FIG. 9B. Placement and arrangement of the fastening plate members (100-6*a*, 100-6*b*) to the single outside corner Cdw of the structure is such that the elongated (or lengthwise) edge portion of both fastening plate members (100-6*a*, 100-6*b*) runs approximately parallel along the vertical edge portion of the single outside corner Cdw of structure as shown in FIG. 9B. In addition, the lengthwise edge portion of both fastening plate members (100-6*a*, 100-6*b*) are placed proximate to one another, meeting along the single outside corner Cdw of the structure as shown in FIG. 9A.

Figure 10B:
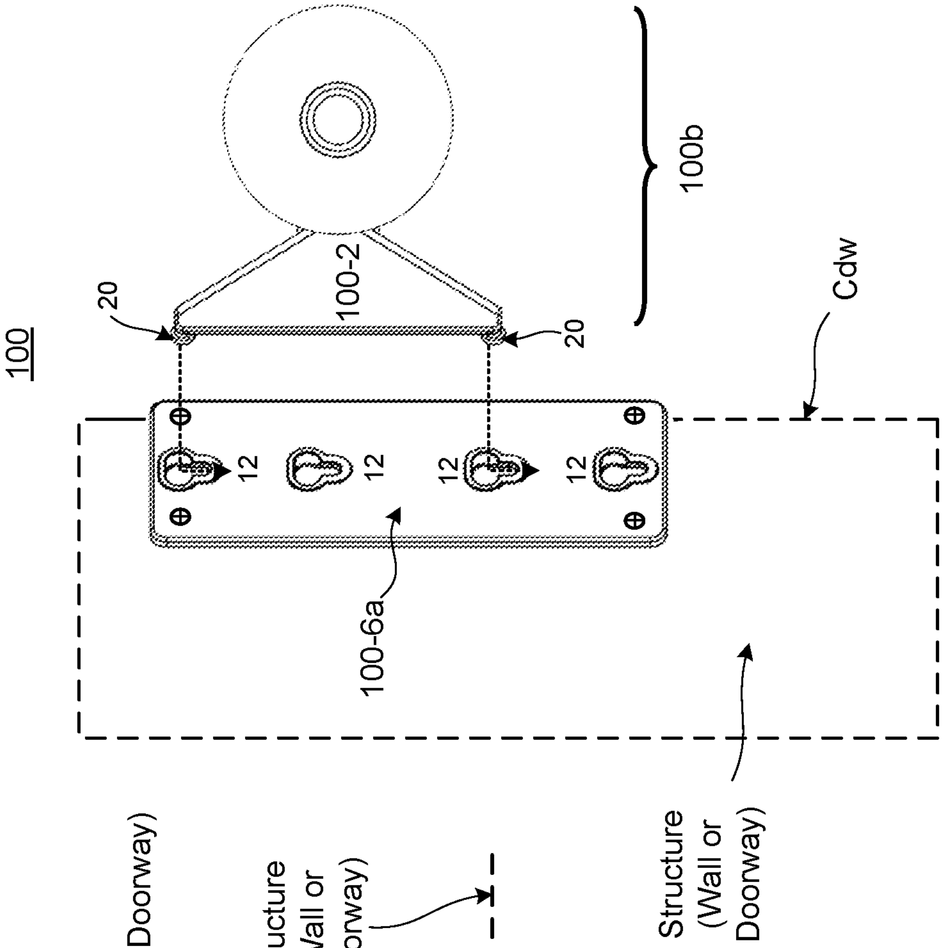
FIG. 10A—FIG. 10B illustrate a top and side view of the detachable roller assembly component prior to installation, in accordance to an embodiment.
Figure 10A:
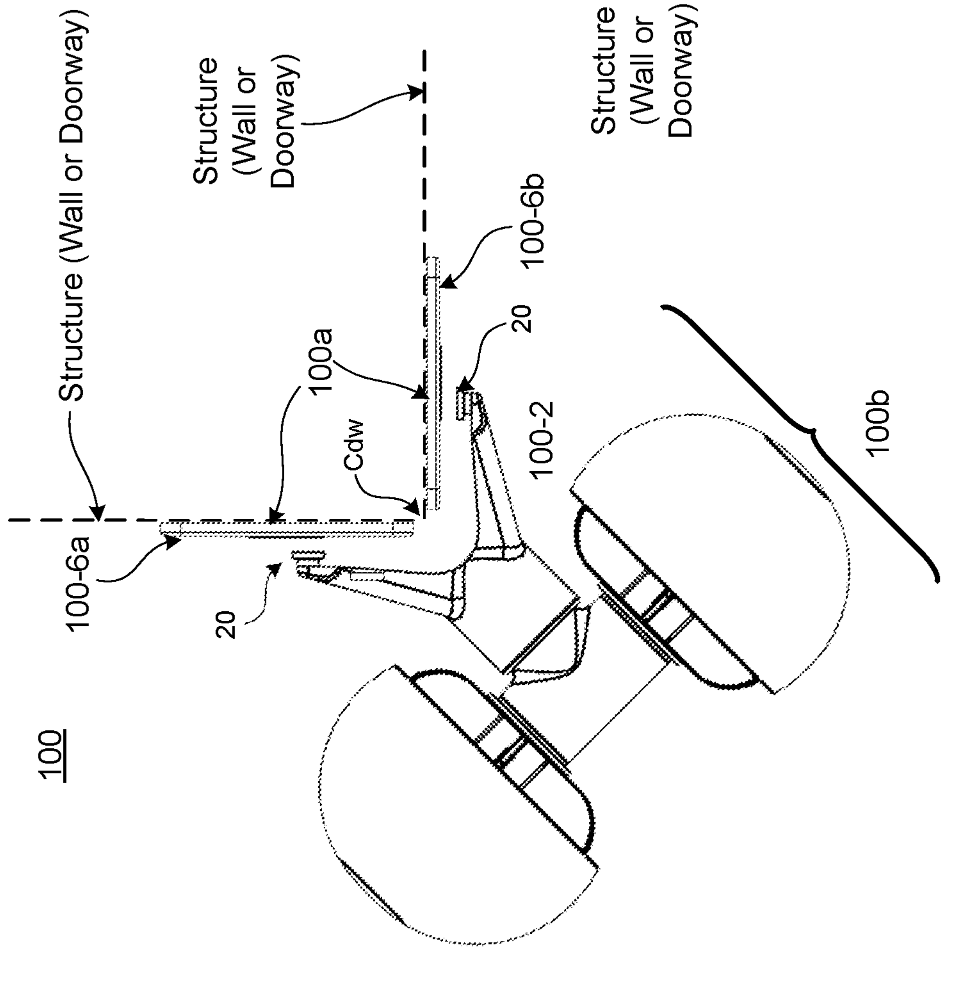

FIG. 10A—FIG. 10B illustrate a top and side view of the detachable roller assembly component 100*b* prior to being installed and mounted to the fastening plate members (100-6*a*, 100-6*b*) that has been fastened to the single outside corner Cdw of the structure, in accordance to an embodiment. Prior to installation, keyed members 20 of the corner-mount adapter member 100-2 are vertically aligned to the adapter keyholes 12 disposed along the center and lengthwise portion of the fastening plate members (100-6*a*, 100-6*b*) as shown in FIG. 10B. Once vertically aligned the keyed members 20 of the detachable roller assembly component 100*b* are inserted through the adapter keyholes 12 and then shifted the downward, thereby securing the detachable roller assembly component 100*b* to the fastening plate members (100-6*a*, 100-6*b*) that have been already mounted to the single outside corner Cdw of the structure. This keyhole mounting technique is ideal for hanging or securing objects as flush as possible against a flat surface (i.e., wall or door). This keyhole mounting system provides a convenient way to conceal the hanging components making it visually appealing.

Figure 11B:
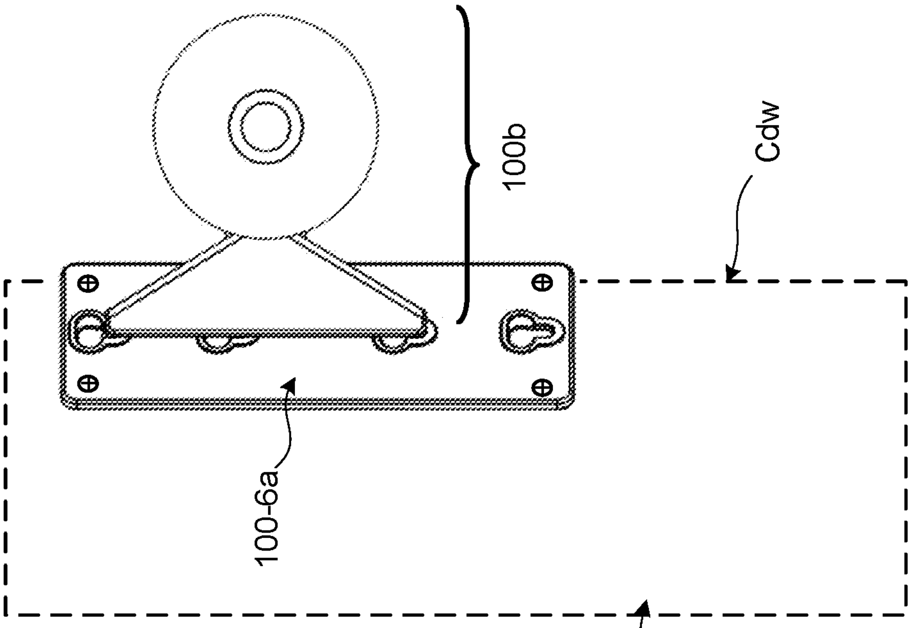
FIG. 11A—FIG. 11B illustrate a top and side view of the detachable roller assembly component after installation, in accordance to an embodiment.
Figure 11A:
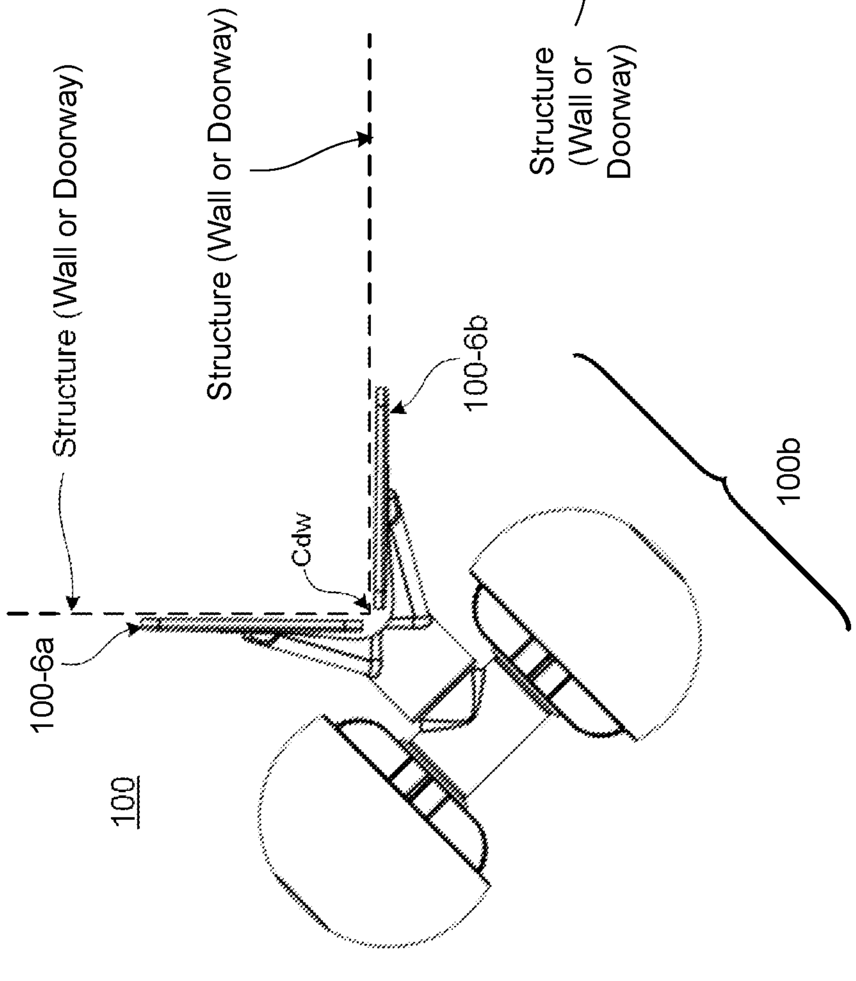

FIG. 11A—FIG. 11B illustrate a top and side view of the detachable roller assembly component 100*b* after it has been secured to the fastening plate members (100-6*a*, 100-6*b*) and ready for use by the user, in accordance to an embodiment. In practice, the user may remove detachable roller assembly component 100*b* from the fastening plate members (100-6*a*, 100-6*b*) by lifting up the detachable roller assembly component 100*b* in a upward direction and then pulling it horizontally away from the fastening plate members (100-6*a*, 100-6*b*) so that the keyed members 20 of the corner-mount adapter member 100-2 are pulled away from the adapter keyholes 12. Advantageously, because the detachable roller assembly component 100*b* is not permanently fixed to the fastening plate members, the user may easily remove it from the path of the structure in order to limit obstruction when not in use. In addition, the detachable roller assembly component 100*b* may be used in different areas throughout the home or building where other fastening plate members (100-6*a*, 100-6*b*) may be fastened.

Figure 12:
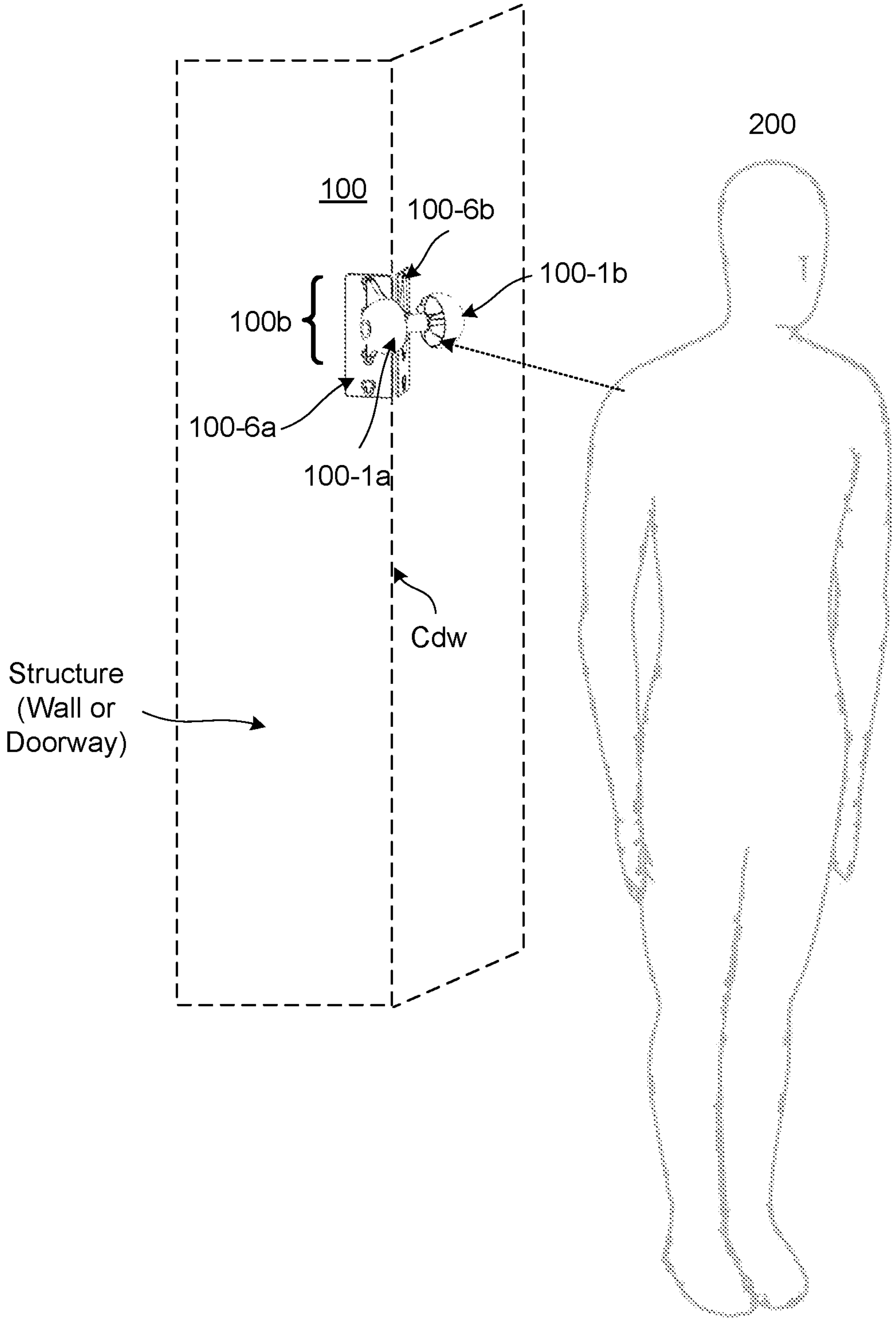
FIG. 12 illustrates a typical application of the massage roller assembly by a user, in accordance to an embodiment.

FIG. 12 illustrates a typical application of the massage roller assembly 100 by a user 200, in accordance to an embodiment. In practice, the massage roller assembly 100 may be mounted to the single outside corner Cdw of the structure at any height that is suitable for the user 200 in order to target specific muscle groups or parts (e.g., neck, back, and legs). Once the roller assembly 100 is secured and fixed to the single outside corner Cdw of the structure, the user 200 may press a desired portion and muscle group of their body against the roller heads (100-1*a*, 100-1*b*) by moving their body in an upward and downward direction while applying an uniform pressure thereon, thereby allowing the user to perform self-massage therapy using the fixed assembly.

Figure 13:
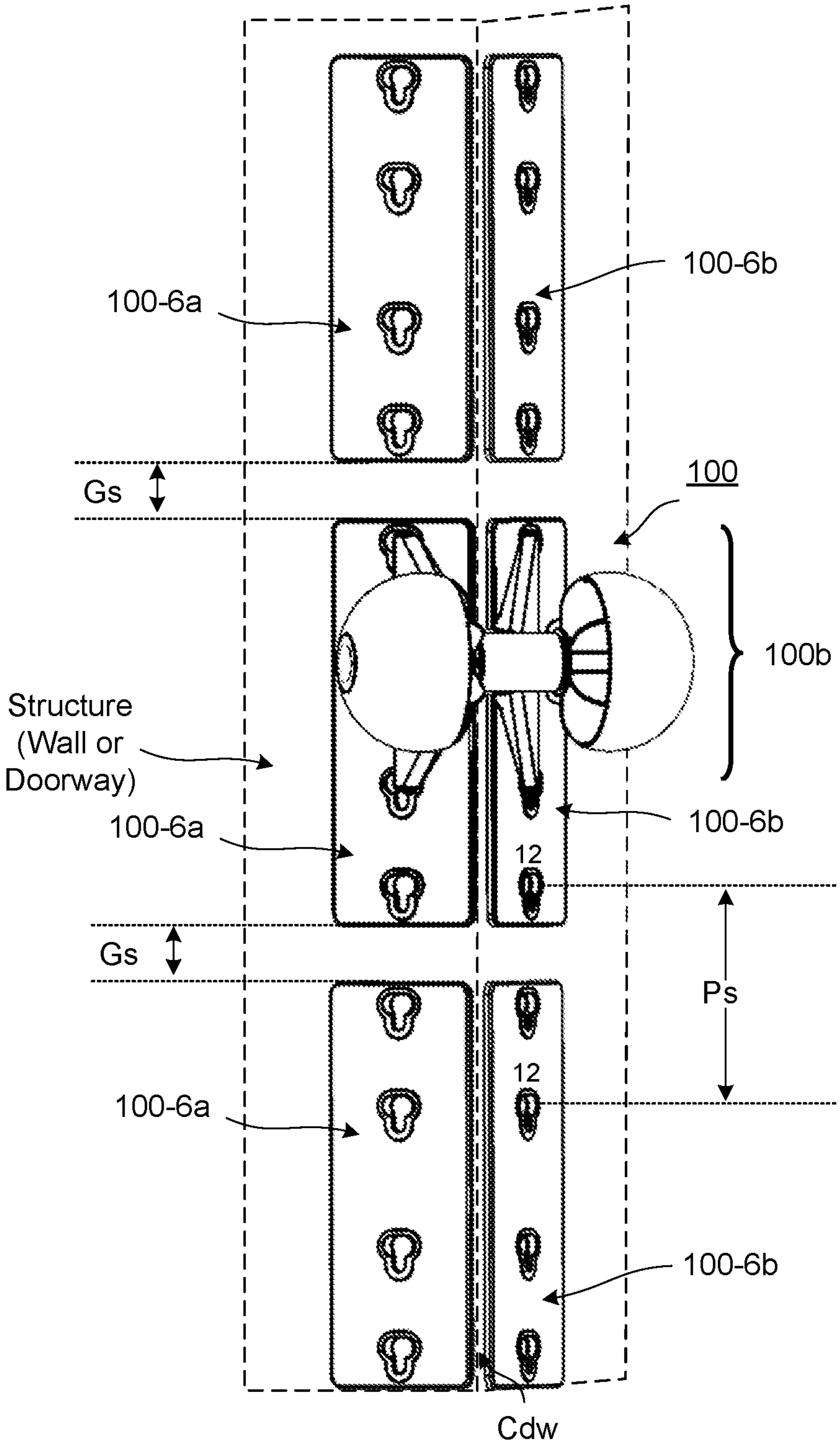
FIG. 13 illustrates multiple fastening plate members vertically stacked for allowing the user to adjust the massage roller assembly at various heights, in accordance to an embodiment.

FIG. 13 illustrates multiple fastening plate members (100-6*a*, 100-6*b*) vertically stacked for allowing the user to adjust the massage roller assembly 100 at various heights, in accordance to an embodiment. In an implementation, the fastening plate members (100-6*a*, 100-6*b*) are vertically stacked so that the short ends of each fastening plate members (100-6*a*, 100-6*b*) are proximate to one another and separated by a gap Gs. In practice, the gap Gs may be set by the user so that a pitch spacing Ps between adapter keyholes 12 of adjacent fastening plate members allows the detachable roller assembly component 100*b* to mount between vertically stacked and adjacent fastening plate members (100-6*a*, 100-6*b*). In addition, multiple pairs of fastening plate members (100-6*a*, 100-6*b*) may be applied below and above the massage roller assembly 100, allowing the user to adjust the height of the detachable roller assembly component 100*b* from as low as the floor to as high as the height of the user.

Figure 14C:
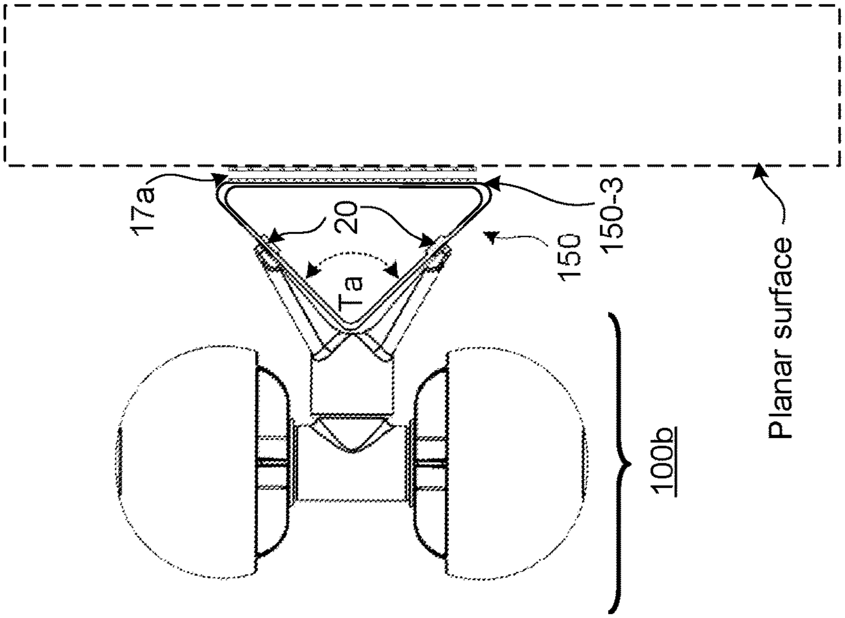
FIG. 14A—FIG. 14C illustrate a triangle block fixture for adapting the massage roller assembly to a planar surface, in accordance to an embodiment.
Figure 14A:
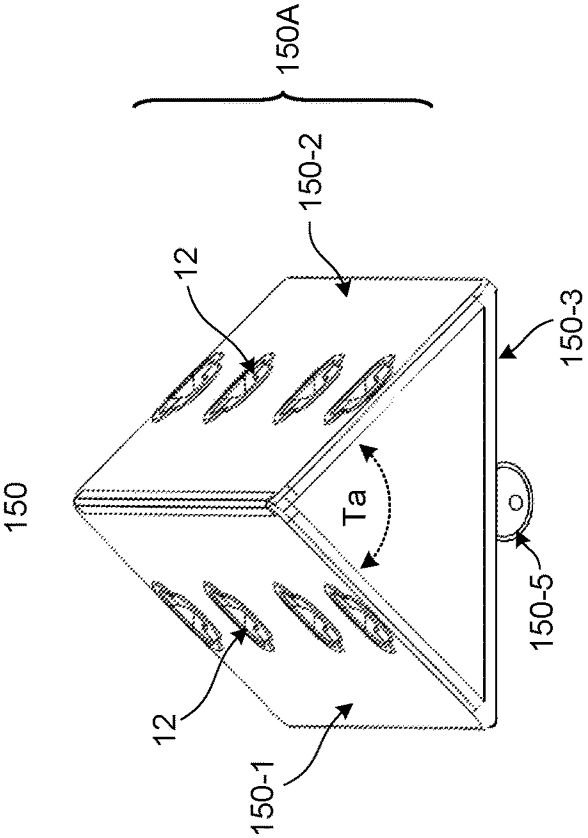
Figure 14B:
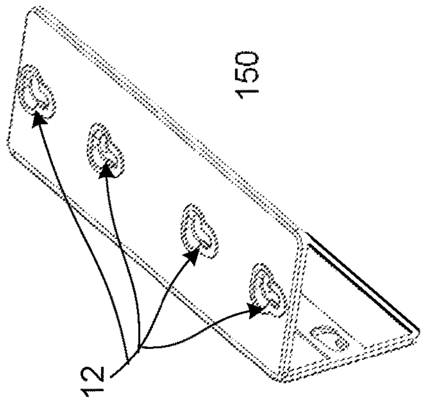
Figure 15A:
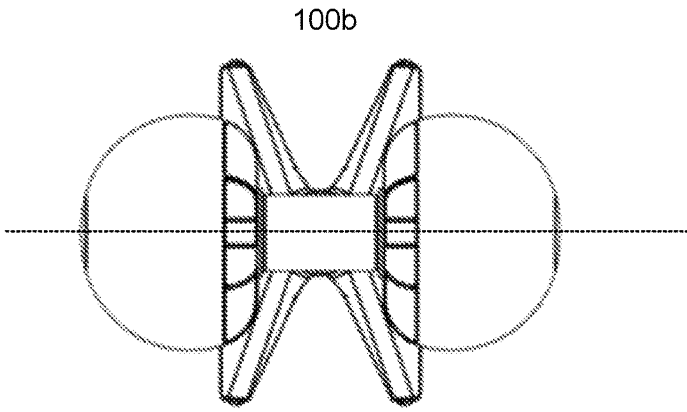
FIG. 15A—FIG. 15D illustrate an application of rotating the axel base of the detachable roller assembly component at fixed increments, in accordance to an embodiment.
Figure 15B:
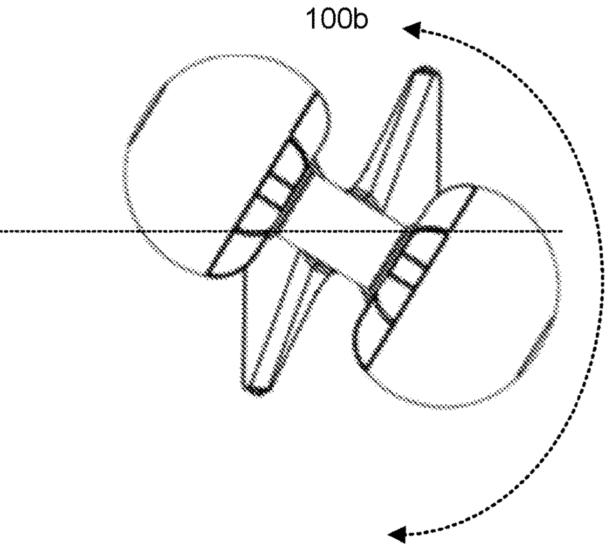
Figure 15C:
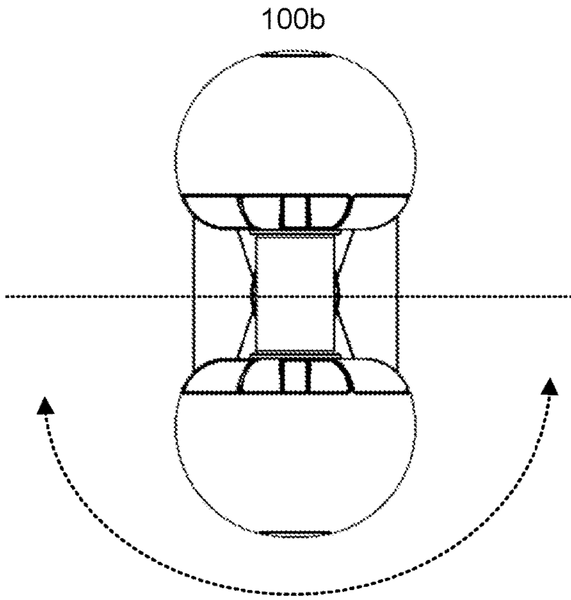
Figure 15D:
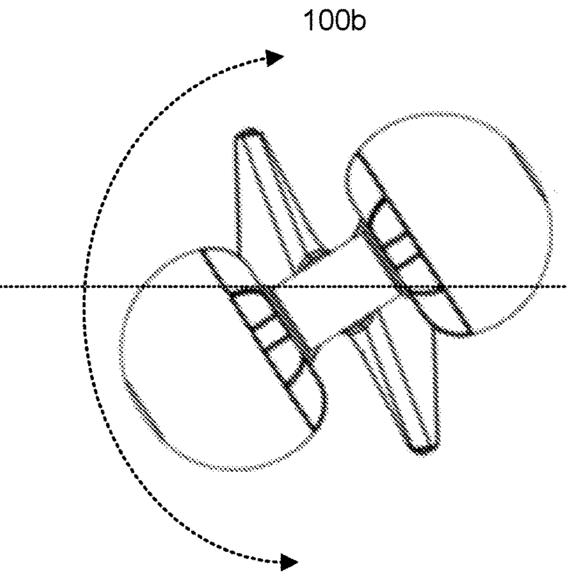
Figure 16A:
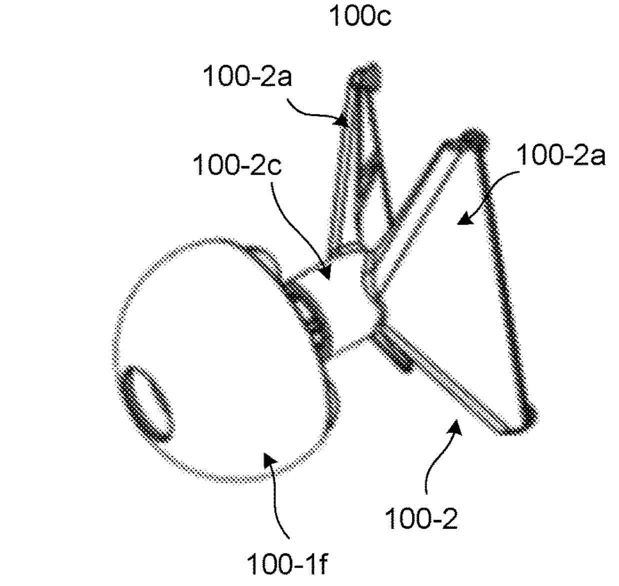
FIG. 16A—FIG. 16D illustrate a single massage head attachment of the massage roller assembly, in accordance to an embodiment.
Figure 16B:
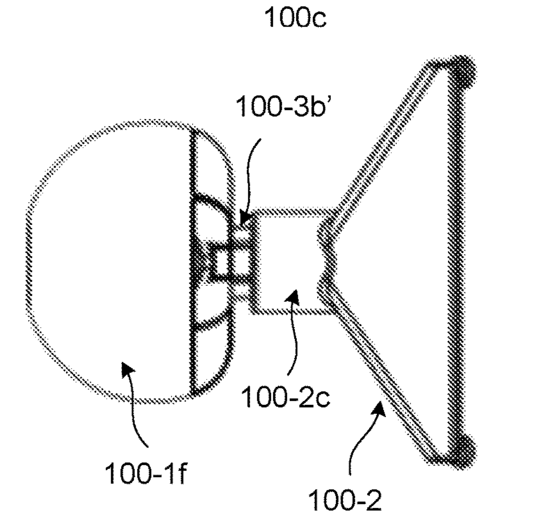
Figure 16C:
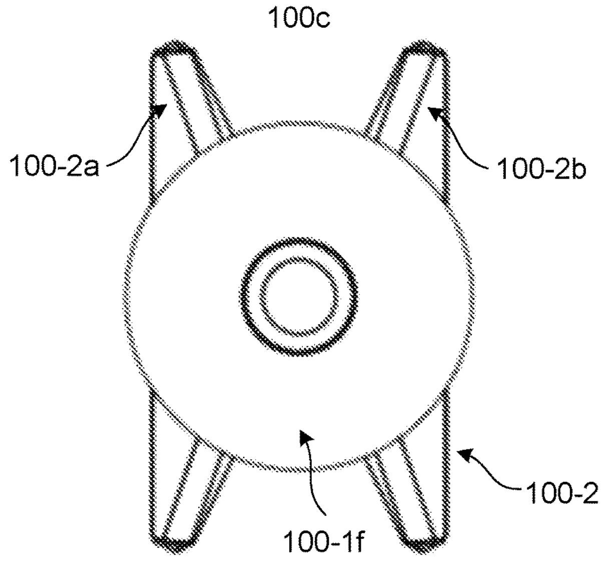
Figure 16D:
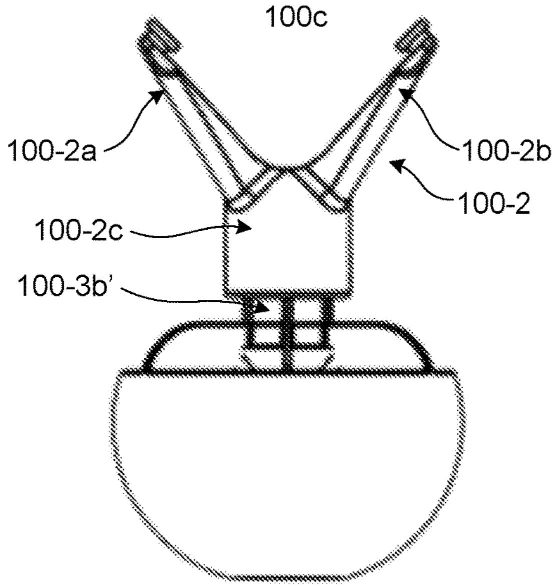

FIG. 14A—FIG. 14C illustrate a triangle block fixture 150 for adapting the massage roller assembly 100 to a planar surface, in accordance to an embodiment. The triangle block fixture 150 may include an adapter fastening plate member 150A having two sides (150-1, 150-2) coupled along a lengthwise portion of the two sides to form a corner angle Ta and a planar attachment member 150-3 coupling the two sides (150-1, 150-2) of the adapter fastening plate member 150A. Adapter keyholes 12 may be disposed along a center and lengthwise portion of the two sides (150-1, 150-2) of the adapter fastening plate member 150A, allowing the keyed members 20 of the detachable roller assembly component 100*b* to attach thereon. The triangle block fixture 150 may also include surface mount tab members 150-5 disposed at a top and bottom end portion of the two sides (150-1, 150-2) of the adapter fastening plate member 150A, allowing the triangle block fixture 150 to be secured and mounted to the planar surface (e.g., flat facing surface of a wall, door, furniture, cabinet, floor, etc.) via screws or other types of wall fasteners as shown in FIG. 14C. Alternatively, triangle block fixture 150 may be secured to the flat surface via hook-and-loop fasteners 17*a* attached to the planar attachment member 150-3. In one aspect, the triangle block fixture 150 is shaped as an equilateral triangular prism having a right angle (90 degree) outside corner Ta, where the outside corner Ta of the triangle block fixture 150 is configured to receive and attach to the detachable roller assembly component 100*b*. In another aspect, the combined structure of the three sides (150-1, 150-2, 150-3) form a hollow interior of the triangle block fixture 150.

FIG. 15A—FIG. 15D illustrate an application of rotating the axel base 100-3 of the detachable roller assembly component 100*b* at fixed increments, in accordance to an embodiment. Referring back to FIG. 6A-6D, the stem connecting member 100-3*b* may include interlocking grooves 22 disposed and evenly spaced along an outer portion of the stem connecting member 100-3*b*, matching the spacing of the interlocking rails 21 of the receiving coupler 100-2*c*1, and thereby allowing the axel base 100-3 to incrementally rotate in a clockwise (CW) or counter-clockwise (CCW) at a fixed number of rotational positions when inserted and attached to the receiving coupler 100-2*c*1. For example, these fixed positions may include a 0-degree rotational position shown in FIG. 15A, a 45-degree rotational position shown in FIG. 15B, a 90-degree rotational position shown in FIG. 15C, and a 135-degree rotational position shown in FIG. 15D. In other embodiments, the fixed number of rotational positions may be configured to be any number of rotational positions between 0 degrees to 360 degrees by modifying the quantity and angular distances of interlocking grooves 22 of the stem connecting member 100-3*b* and corresponding interlocking rails 21 of the receiving coupler 100-2*c*1, allowing the user to adjust and rotate the axel base 100-3 at a fixed number of rotational increments.

FIG. 16A—FIG. 16D illustrate a single massage head attachment 100*c* of the massage roller assembly 100, in accordance to an embodiment. In this configuration, the corner-mount adapter member 100-2, including support arm members (100-2*a*, 100-2*b*) and fastening plate members (100-6*a*, 100-6*b*), are the same components used in the two-roller head configuration, having the same form and functionality as previously described hereinabove. However, the single massage head attachment 100*c* includes a single massage head 100-1*f* having a stem connecting member 100-3*b*' coupled to an inner portion of the single massage head 100-1*f*. The stem connecting member 100-3*b*' may be detachably inserted into the receiving coupler 100-2*c*1 of the corner-mount adapter member 100-2 when fully assembled. In practice, the roller head types are configured to be detachable and interchangeable between various massage head components including, for example, the two-roller assembly and the single massage head attachment 100*c* via the stem connecting member which is detachably coupled to the receiving coupler 100-2*c*1 of the corner-mount adapter member 100-2.

Unlike conventional massage devices, the massage roller assembly 100 is a fixed and corner-mountable massage tool that is simple, convenient, and effective for providing a user self-massage therapy. Key advantages and benefits the massage roller assembly 100 include: 1) a compact, lightweight, and impact-resistant design that may be applied to any available outside corner of a structure in a home, gym, or medical care facility; 2) a non-intrusive and non-interfering body when attached to the outside corner of the structure, causing minimal obstruction to those walking in the path of the entry way; 3) an adjustable and rotating feature by which an axel member of the detachable roller assembly component allows the user to adjust and rotate the axel base at an increased number of rotational increments; 4) a detachable roller head assembly which allows the user to detach and interchange roller heads between a two-roller assembly and a single massage head attachment; and 5) a triangular block fixture for adapting the corner-mount adapter member to a planar surface of any structure.

Figure 17A:
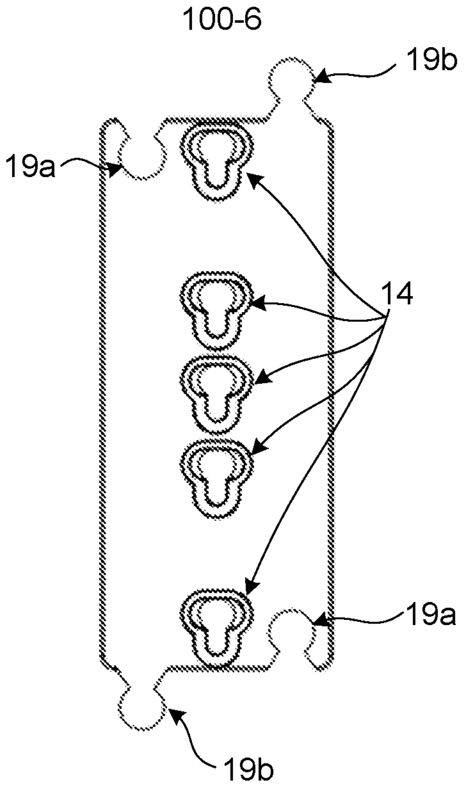
FIG. 17A—FIG. 17B illustrate another implementation of the fastening plate member with interlocking key-slot tabs, in accordance to an embodiment.
Figure 17B:
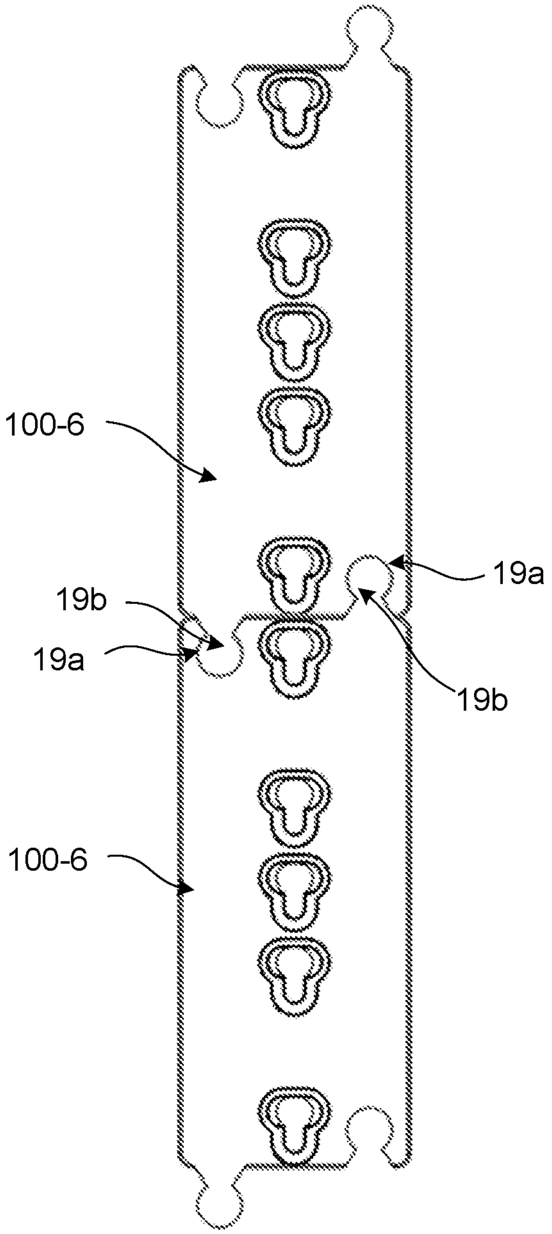

FIG. 17A—FIG. 17B illustrate another implementation of the fastening plate member 100-6, in accordance to an embodiment. In this alternate configuration, the fastening plate member 100-6 may include an interlocking key-slot tabs (19*a*, 19*b*) disposed along a top portion and bottom portion of the fastening plate member 100-6. In addition, the plate mounting slots 14 are distributed along a lengthwise center portion of the fastening plate members 100-6 having three plate mounting slots stacked in close proximity, a single plate mounting slots disposed near the top portion of the fastening plate member 100-6, and another single plate mounting slots disposed near the bottom portion of the fastening plate member 100-6 as shown in FIG. 17A. In practice, two or more fastening plate members 100-6 may be vertically stacked and interlocked with one another via the interlocking key-slot tabs (19*a*, 19*b*) as shown in FIG. 17B, thereby increasing the total length of the fastening plate members 100-6 and allowing the user to adjust the massage roller assembly 100 at various heights.

Figure 18:
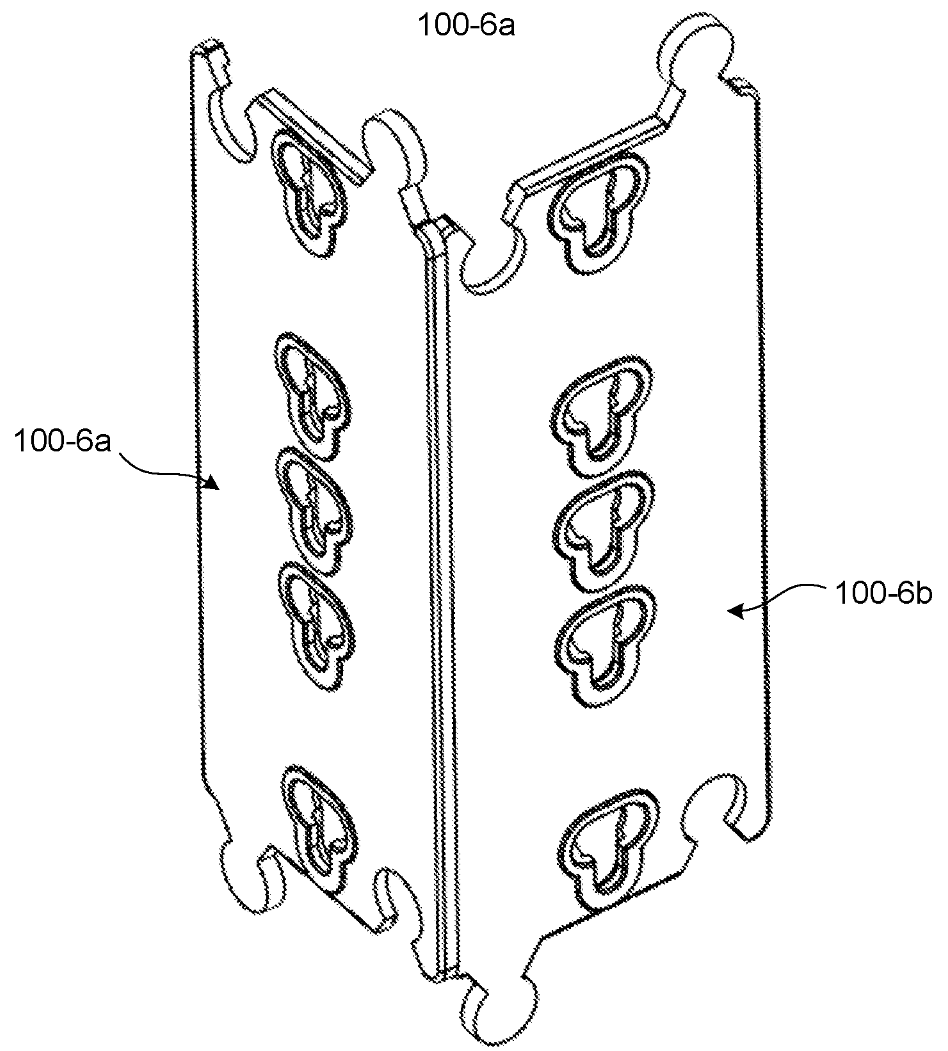
FIG. 18 illustrates another implementation of the fastening component having a unitary body, in accordance to an embodiment.
Figure 19A:
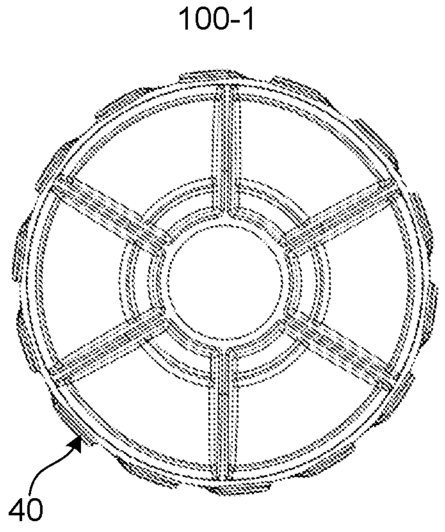
FIG. 19A—FIG. 19D illustrate another implementation of the roller head with tread members disposed thereon, in accordance to an embodiment.
Figure 19B:
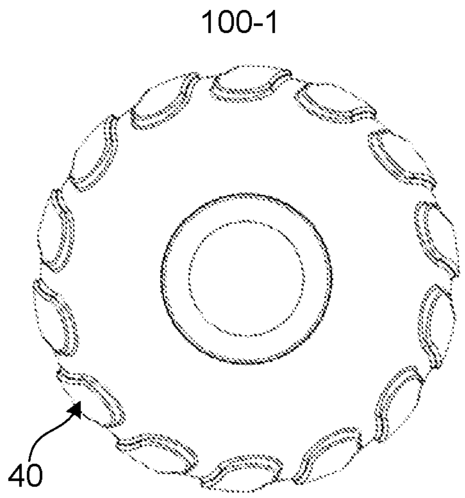
Figure 19C:
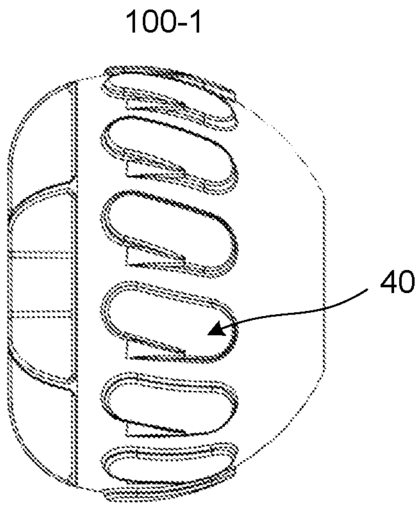
Figure 19D:
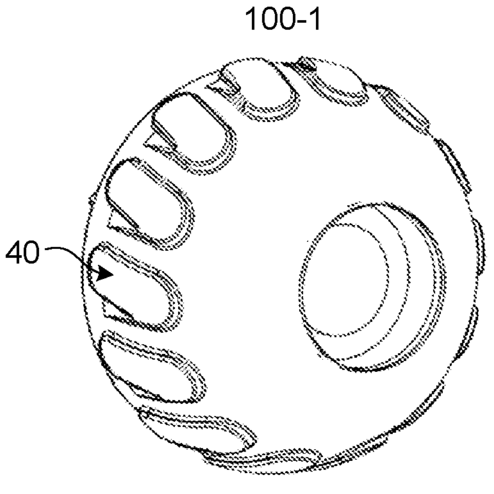
Figure 20A:
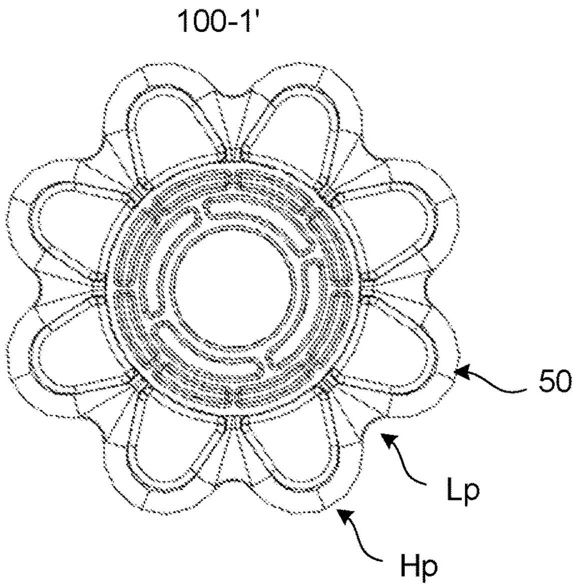
FIG. 20A—FIG. 20D illustrate yet another implementation of the roller head, in accordance to an embodiment.
Figure 20B:
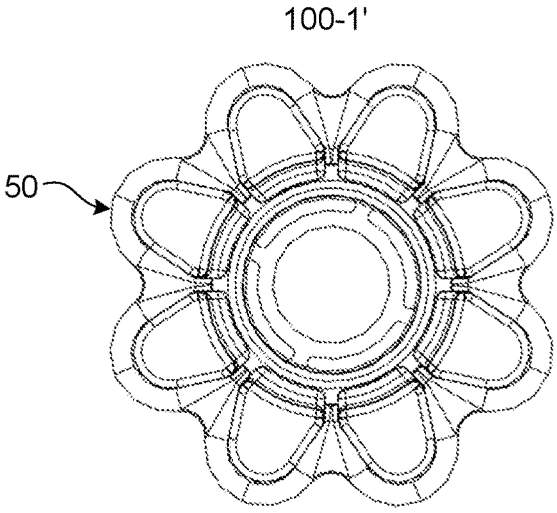
Figure 20C:
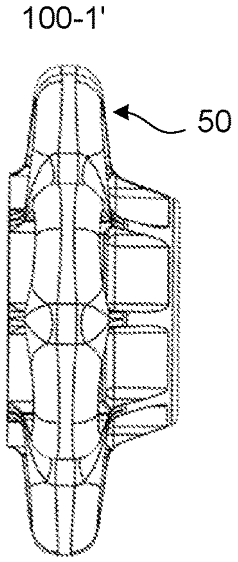
Figure 20D:
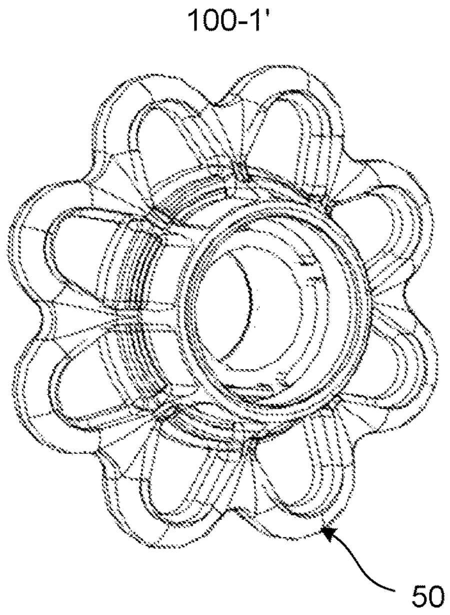

FIG. 18 illustrates another implementation of the fastening component 100*a* having a unitary body, in accordance to an embodiment. In another implementation, instead of the two separate fastening plate members (100-6*a*, 100-6*b*), the fastening component may include a unitary part which includes the two fastening plate members (100-6*a*, 100-6*b*) that are joined together (via weld or molding process techniques) along a lengthwise edge of each plate member to form the single part having plate members separated by a 90 degree angle.

FIG. 19A—FIG. 19D illustrate an alternate configuration of the roller head 100-1 with tread members 40 disposed thereon, in accordance to an embodiment. In this alternate configuration, the tread members 40 include a series of protruding elements (e.g., bumps) that are equally distributed along an outer periphery of the hemispherical shaped structure, thereby providing texture to the roller head 100-1 for enhancing and refining massage treatment to targeted muscle groups.

FIG. 20A—FIG. 20D illustrate a knuckle-type roller head 100-1', in accordance to an embodiment. In this alternate configuration, the roller head 100-1' may have a wheel-like body with eight knuckle shaped members 50 that are equally spaced and distributed along an outer edge portion of the wheel-like body, forming a series of low points Lp and high points Hp along the outer edge portion. When applied to the massage roller assembly 100, these low and high points (Lp, Hp) of the knuckle shaped members 50 provide a change in massage pressure points when the roller head 100-1' is rotating about its central axis. In practice, these knuckle shaped members 50 of the roller head 100-1' can increase and decrease the depth pressure at each knuckle point, thereby simulating a deep tissue massage.

As used in the specification and the appended claims, the singular forms "a", "an", and "the" included plural referents unless the context clearly dictates otherwise.

All patents, patent applications, and other references cited herein are incorporated by reference in their entireties.

It is noted that the foregoing disclosure has been provided merely for the purpose of explanation and is in no way to be construed as limiting of the present disclosure. Although the present disclosure has been shown and described with respect to several preferred embodiments thereof, various changes, omissions, and additions to the form and detail thereof, may be made therein, without departing from the spirit and scope of the disclosure. It is understood that the words which have been used herein are words of description and illustration, rather than words of limitation. Changes may be made, within the purview of the appended claims, as presently stated and as amended, without departing from the scope and spirit of the present disclosure in its aspects.

Other embodiments and modifications of the present disclosure may occur to those of ordinary skill in the art in view of these teachings. Accordingly, the disclosure is to be limited only by the following claims which include all other such embodiments and modifications when viewed in conjunction with the above specifications and accompanying drawings.

What is claimed is:

1. A corner mounted massage roller assembly comprising:

a fastening component having one or more fastening plate members for mounting to an outside corner of a structure; and a detachable roller assembly component having a corner-mount adapter member detachably coupled to a massage head component by an axle base, wherein the corner-mount adapter member is structured to fit against and detachably mount to the outside corner of the structure via the fastening component;

wherein a triangle block fixture is coupled to the detachable roller assembly component for adapting the corner mounted massage roller assembly to a flat surface.

2. The corner mounted massage roller assembly of claim 1, wherein the axle base includes a stem connecting member by which the corner-mount adapter member is detachably coupled to the massage head component, and wherein each fastening plate member has a thin rectangular body with keyhole slots disposed therein.

3. The corner mounted massage roller assembly of claim 2, wherein the corner-mount adapter member includes a base member having a receiving coupler disposed at a first end of the base member and a Y-bracket member disposed and attached to a second opposing end of the base member.

4. The corner mounted massage roller assembly of claim 3, wherein the Y-bracket member includes two support arm members having an angular separation of approximately 90 degrees.

5. The corner mounted massage roller assembly of claim 4, wherein each support arm member includes keyed members which are disposed at distal ends of each support arm member.

6. The corner mounted massage roller assembly of claim 5, wherein the keyed members are detachably coupled to the keyhole slots.

7. The corner mounted massage roller assembly of claim 3, wherein the receiving coupler of the corner-mount adapter member includes interlocking rails disposed and evenly spaced along an interior portion of the receiving coupler.

8. The corner mounted massage roller assembly of claim 7, wherein the stem connecting member includes interlocking grooves disposed and evenly spaced along an outer portion of the stem connecting member, matching the spacing of the interlocking rails of the receiving coupler, and allowing the axle base to incrementally rotate at a fixed number of positions when inserted and attached to the receiving coupler of the corner-mount adapter member.

9. The corner mounted massage roller assembly of claim 3, wherein the stem connecting member of the detachable roller assembly component is detachably coupled to the receiving coupler of the corner-mount adapter member.

10. The corner mounted massage roller assembly of claim 1, wherein the massage head component includes a two-roller assembly or a single massage head attachment.

11. The corner mounted massage roller assembly of claim 10, wherein a cover is applied on the two-roller assembly or the single massage head attachment.

12. The corner mounted massage roller assembly of claim 10, wherein the two-roller assembly includes hemispherical shaped heads, protruding shaped heads, tapered capsule shaped heads, bell-shaped heads, or double spheroidal heads.

13. The corner mounted massage roller assembly of claim 1, wherein the fastening component is mounted to the outside corner of the structure by hook-and-loop fasteners, drywall screws, wood screw, c-screws, 1-screws, or double-side adhesive tape.

14. The corner mounted massage roller assembly of claim 1, wherein the corner mounted massage roller assembly is configured to be mounted to the outside corner of the structure at a height that is between a head portion and a foot portion of a user.

15. The corner mounted massage roller assembly of claim 1, wherein the triangle block fixture has a shape of an equilateral triangular prism.

16. The corner mounted massage roller assembly of claim 15, wherein a planar portion of the triangle block fixture is mounted to the flat surface via screws or hook-and-loop fasteners.

17. The corner mounted massage roller assembly of claim 1, wherein an axle member is inserted and disposed in an axle opening of the axle base.

18. The corner mounted massage roller assembly of claim 17, wherein a first roller head is disposed at a first end portion of the axle member and a second roller head is disposed at a second end portion of the axle member, wherein the first roller head and second roller head are fastened to the axle member via washers and self-locking retaining rings or other retaining fasteners.

19. The corner mounted massage roller assembly of claim 1, wherein the fastening component includes two or more pairs of fastening plate members which are vertically stacked when mounted to the outside corner of the structure.

* * * * *